United States Patent
Sun et al.

(10) Patent No.: US 12,160,315 B2
(45) Date of Patent: Dec. 3, 2024

(54) TECHNIQUES FOR PUCCH OPERATION WITH MULTI-TRP

(71) Applicant: APPLE INC., Cupertino, CA (US)

(72) Inventors: Haitong Sun, Cupertino, CA (US); Yushu Zhang, Beijing (CN); Chunxuan Ye, San Diego, CA (US); Haijing Hu, Cupertino, CA (US); Jia Tang, Cupertino, CA (US); Wei Zeng, Cupertino, CA (US); Wei Zhang, Cupertino, CA (US); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 455 days.

(21) Appl. No.: 17/442,645

(22) PCT Filed: Jun. 11, 2021

(86) PCT No.: PCT/CN2021/099693
§ 371 (c)(1),
(2) Date: Sep. 24, 2021

(87) PCT Pub. No.: WO2022/028108
PCT Pub. Date: Feb. 10, 2022

(65) Prior Publication Data
US 2022/0311545 A1 Sep. 29, 2022

(30) Foreign Application Priority Data
Aug. 6, 2020 (WO) ................ PCT/CN2020/107487

(51) Int. Cl.
*H04L 1/08* (2006.01)
*H04L 1/1812* (2023.01)
(Continued)

(52) U.S. Cl.
CPC .............. *H04L 1/08* (2013.01); *H04L 1/1812* (2013.01); *H04L 5/0053* (2013.01); *H04W 72/0446* (2013.01); *H04W 72/21* (2023.01)

(58) Field of Classification Search
CPC ....... H04L 1/08; H04L 1/1812; H04L 5/0053; H04L 1/1858; H04W 72/0446; H04W 72/21
See application file for complete search history.

(56) References Cited

U.S. PATENT DOCUMENTS 11,611,412 B2 3/2023 Takeda et al.
2020/0015222 A1* 1/2020 Huang .................. H04W 72/04
(Continued)

FOREIGN PATENT DOCUMENTS

CN 111107555 A 5/2020
EP 3550918 A1 10/2019
(Continued)

OTHER PUBLICATIONS

WILUS Inc, Remaining Issues on HARQ-ACK Transmission, 3GPP TSG RAN WG1 Meeting #95, Nov. 12-16, 2018, R1-1813531, entire pages (Year: 2018).*

(Continued)

*Primary Examiner* — Ayaz R Sheikh
*Assistant Examiner* — Mang Boi Thawng
(74) *Attorney, Agent, or Firm* — Dorsey & Whitney LLP

(57) ABSTRACT

Techniques for physical uplink control channel (PUCCH) operation with multiple transmission and reception point (multi-TRP) are disclosed. In some embodiments, determining PUCCH transmission repetition may include determining that an original PUCCH transmission overlaps a slot boundary between a first slot for PUCCH transmission and a second slot for PUCCH transmission, and configuring a PUCCH repetition of the original PUCCH transmission. The PUCCH repetition may include one or more symbols of the original PUCCH transmission and may be located in one or more slots other than the first slot and the second slot. The PUCCH repetition may be configured by a downlink control information (DCI) configuration that includes a physical downlink shared channel to hybrid automatic repeat request acknowledgement feedback (PDSCH-to-HARQ_feedback) timing indicator, a PUCCH repetition number field that configures a number of transmissions of the PUCCH repetition, or a PUCCH resource indicator field that configures a number of transmissions of the PUCCH repetition.

15 Claims, 12 Drawing Sheets

(51) Int. Cl.
*H04L 5/00* (2006.01)
*H04W 72/0446* (2023.01)
*H04W 72/21* (2023.01)

(56) References Cited

U.S. PATENT DOCUMENTS

| | | | | |
|---|---|---|---|---|
| 2020/0205150 | A1* | 6/2020 | Cheng | H04W 72/21 |
| 2020/0351891 | A1* | 11/2020 | Hosseini | H04W 72/53 |
| 2020/0383105 | A1* | 12/2020 | Park | H04L 1/1896 |
| 2021/0037519 | A1* | 2/2021 | Matsumura | H04J 13/0074 |
| 2021/0352657 | A1* | 11/2021 | Choi | H04L 5/0053 |
| 2022/0408420 | A1 | 12/2022 | Li et al. | |
| 2023/0060179 | A1* | 3/2023 | Yin | H04L 5/0012 |
| 2023/0171778 | A1* | 6/2023 | Kittichokechai | H04L 1/1671 370/329 |
| 2023/0198682 | A1* | 6/2023 | Khoshnevisan | H04L 1/08 370/329 |

FOREIGN PATENT DOCUMENTS

| | | |
|---|---|---|
| WO | 2019214468 A1 | 11/2019 |
| WO | 2020010006 A1 | 1/2020 |
| WO | 2020017059 A1 | 1/2020 |
| WO | 2020026297 A1 | 2/2020 |

OTHER PUBLICATIONS

Huawei, Hisilicon, et al., "Enhancements on multi-TRP/panel transmission", R1-1910073, 3GPP TSG RAN WG1 Meeting #98bis, Chongqing, China, Agenda Item 7.2.8.2, Oct. 14-20, 2019, 12 pages.

PCT/CN2021/099693, International Search Report and Written Opinion, Sep. 10, 2021, 9 pages.

Asustek, "CR on multi-slot PUCCH repetition overlap with a single PUSCH", R1-2004573, 3GPP TSG RAN WG1 #101-e, Draft Change Request 38.213, Current Version: 15.9.0, May 25-Jun. 5, 2020, 6 pages.

LG Electronics, "PUSCH enhancements for NR URLLC", R1-1906666, 3GPP TSG RAN WG1 #97, Reno, Nevada, USA, Agenda Item 7.2.6.3, May 13-17, 2019, 14 pages.

Moderator (Apple Inc.), "Summary #2 of [101-e-NR-L 1enh-URLLC-PUSCH-02] (AI 7.2.5.3)", R1-2004981, 3GPP TSG-RAN WG1 Meeting #101-e e-Meeting, Agenda Item 7.2.5.3, May 25-Jun. 5, 2020, 3 pages.

Moderator (Apple Inc.), "Summary of [101-e-NR-L1enh-URLLC-PUSCH-04] (AI 7.2.5.3)", R1-2004742, 3GPP TSG-RAN WG1 Meeting #101-e e-Meeting, Agenda Item 7.2.5.3, May 25-Jun. 5, 2020, 2 pages.

Moderator (VIVO), "Summary on email discussion [1 OOb-e-NR-L 1 enh-URLLC-eCG-02]", R1-2002805, 3GPP TSG RAN WG1 #100bis, e-Meeting, Agenda Item 7.2.5.6, Apr. 20-30, 2020, 2 pages.

Nokia, Nokia Shanghai Bell, "Summary #2 of PUSCH enhancements for NR eURLLC (AI 7.2.6.3)", R1-1913444, 3GPP TSG-RAN WG1 Meeting #99, Reno, NV, USA, Agenda Item 7.2.6.3, Nov. 18-22, 2019, 2 pages.

NTT DOCOMO, INC., "Summary on Email discussion [100b-e-NR-UEFeatures-URLLC/IIoT-04]", R1-2002871, 3GPP TSG RAN WG1 #100bis-e e-Meeting, Agenda Item 7.2.11.5, Apr. 20-30, 2020, 6 pages.

SAMSUNG, "UL Control for URLLC", R1-1906956, 3GPP TSG RAN WG1 #97, Reno, Nevada, Agenda Item 7.2.6.2, May 13-17, 2019, 6 pages.

* cited by examiner

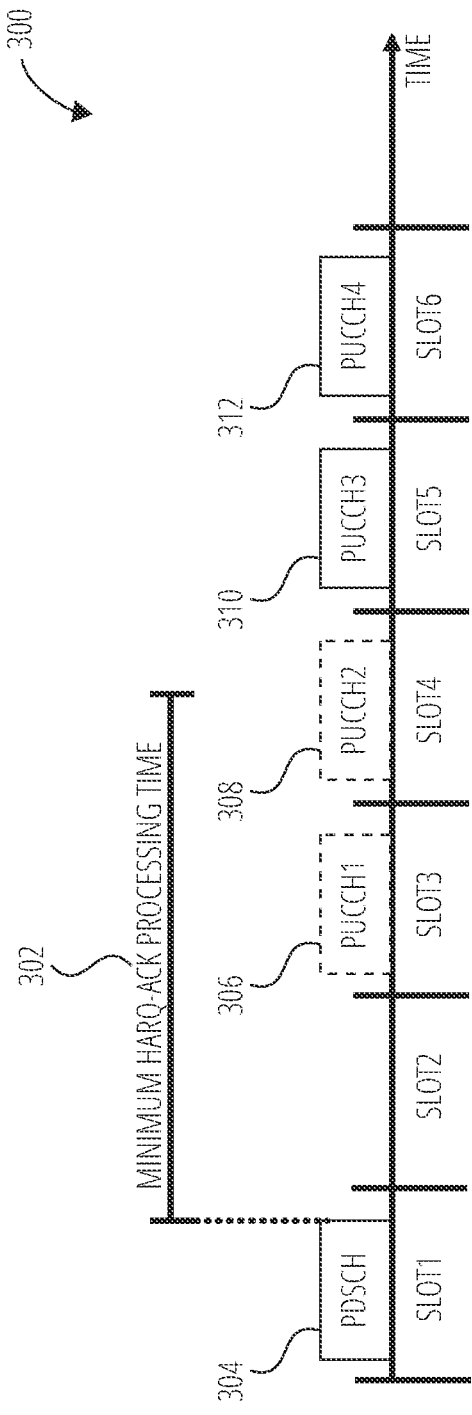
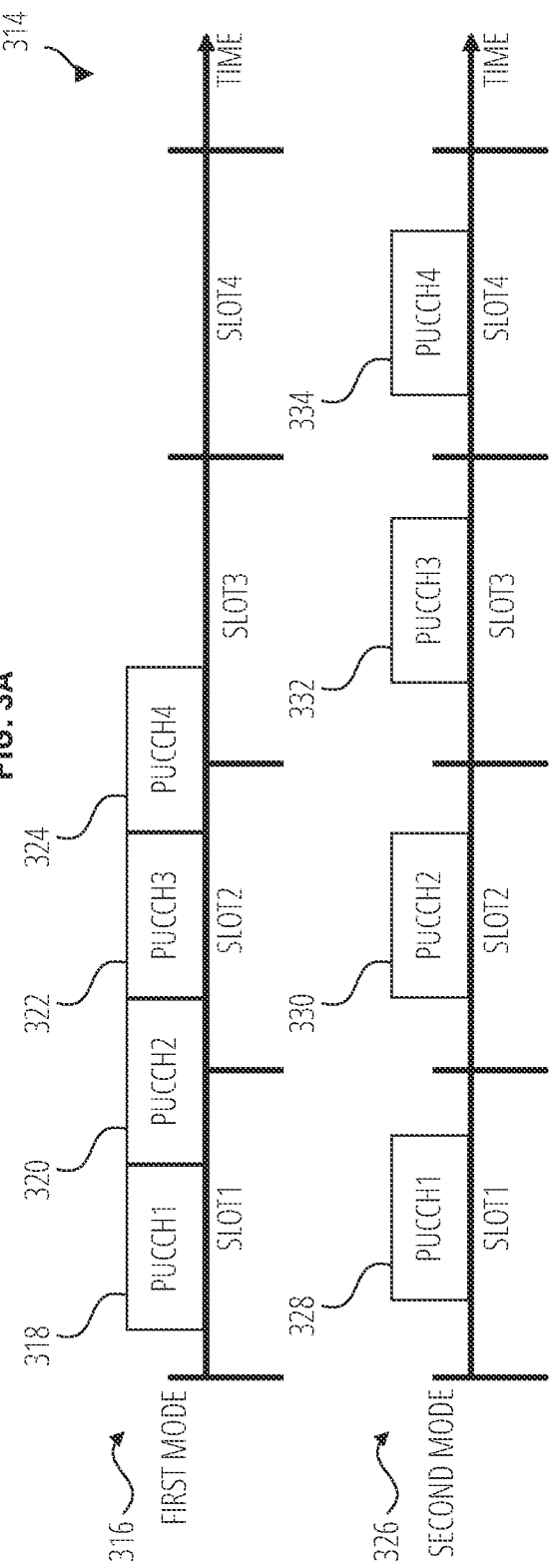
FIG. 3A
FIG. 3B

TECHNIQUES FOR PUCCH OPERATION WITH MULTI-TRP

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A illustrates a diagram showing an example minimum timing offset that reflects minimum hybrid automatic repeat request acknowledgement (HARQ-ACK) processing time for a physical downlink shared channel (PDSCH) in accordance with some embodiments.

FIG. 3B illustrates a diagram showing a first repetition mode and a second repetition mode in accordance with some embodiments.

DETAILED DESCRIPTION

Figure 1:
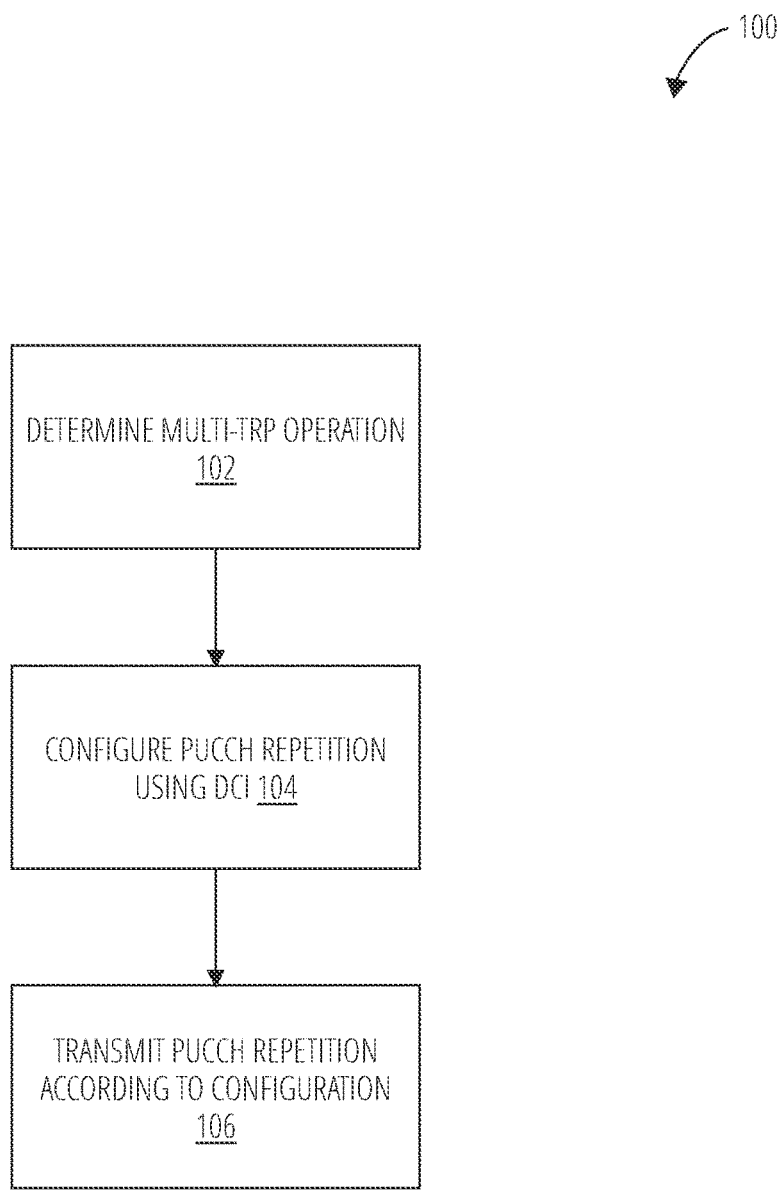
FIG. 1 illustrates a process for configuring physical uplink control channel (PUCCH) repetition in accordance with some embodiments.

In new radio (NR) physical uplink control channel (PUCCH) designs, the PUCCH may have one of the following formats. PUCCH Format 0: 1 to 2 symbols, 1 to 2 bits payload; PUCCH Format 1: greater than or equal to 4 symbols, 1 to 2 bits payload; PUCCH Format 2: 1 to 2 symbols, greater than 2 bits payload: PUCCH Format 3: greater than or equal to 4 symbols, greater than 2 bits payload; PUCCH Format 4: greater than or equal to 4 symbols, greater than 2 bits payload. PUCCH slot aggregation may be allowed. For example, radio resource control (RRC) may configure the parameter nrofSlots in the PUCCH-FormatConfig parameter of the PUCCH-Config Parameter. Moreover, PUCCH beam can be changed via a media access control (MAC) control element (CE), MAC-CE. For example, RRC can configure a list of PUCCH-SpatialRelationInfo parameters in the PUCCH-Config parameter and the MAC-CE can be used to activate a particular beam for a particular PUCCH resource. Only one beam may be configured for one PUCCH resource.

In 3GPP Release 16, for multiple transmission and reception point (multi-TRP) operation, physical downlink shared channel (PDSCH) reliability may be enhanced by allowing more dynamic PDSCH aggregation using downlink control information (DCI) control, and multiple beams can be configured for the same PDSCH with multiple transmission occasions. Embodiments of the present disclosure may enhance PUCCH reliability including, for example, for multi-TRP operation. In some embodiments, DCI is used to configure the dynamic PUCCH repetition. In some embodiments, PUCCH repetition enhancement is provided. In some embodiments, PUCCH beam configuration enhancement is provided. In some embodiments, a default beam is provided for when PUCCH-SpatialRelationInfo is not provided.

As noted above, in some embodiments. DCI can be used to configure the dynamic PUCCH repetition in accordance with one or more of the following solutions.

Solution 1.1

In some embodiments, DCI can be used to configure the dynamic PUCCH repetition by enhancing the DCI field "PDSCH-to-HARQ_feedback timing indicator." For example, a code point may be configured for the DCI field "PDSCH-to-HARQ_feedback timing indicator." The code point may be configured in the dl-DataToUL-ACK parameter, dl-DataToUL-ACK-r16 parameter, or dl-DataTo U L-ACKForDCIFormat1_2 parameter, of the PUCCH-Config parameter. For each code point, RRC can configure the following information at the same time: the timing offset which, for example, can be a value of the range 0 to 15; and the number of PUCCH repetitions which, for example, can be a value of the range 1 to N, where N is at least greater than 8. Alternatively, the number of repetitions may not be configured: in such a case, the number of repetitions may be assumed to be 1.

Solution 1.2

In some embodiments, DCI can be used to configure the dynamic PUCCH repetition by introducing a new DCI field. For example, the new DCI field can be the number of PUCCH repetitions. The value of the new DCI field can be from 1 to N, where N is at least greater than 8. If the new DCI field is not configured, the number of repetitions may be assumed to be 1.

Solution 1.3

In some embodiments, DCI can be used to configure the dynamic PUCCH repetition by configuring the DCI field "PUCCH resource indicator." The PUCCH-Resource configuration can be enhanced by adding the configuration information element (IE) of the number of repetitions. The value of the number of repetitions and/or PUCCH resource indicator can be from 1 to N, where N is at least greater than 8. When the value of the number of repetitions and/or PUCCH resource indicator is not configured, the value is assumed to be 1.

Solution 1.4

In some embodiments, PUCCH aggregation (or repetition) enhancement can be restricted to certain of the PUCCH formats discussed above. For example, only for the long PUCCH formats, e.g., one, a subset, or all of the following formats may have enhancement: PUCCH format 1, PUCCH format 3, PUCCH format 4.

In some embodiments, PUCCH repetition enhancement may be provided using one or more of the following solutions.

Solution 2.1

In some embodiments, when PUCCH repetition is scheduled, a user equipment (UE) is allowed to operate in the following two possible repetition modes: Mode 1, where PUCCHs are repeated back to back, and where a constant may also be configured between the PUCCH repetitions; or Mode 2, where PUCCHs are repeated in consecutive slots, and may use the same time domain allocation within each slot.

Solution 2.2

In some embodiments, a UE can report the maximum number of PUCCH repetitions the UE can transmit within a slot. For example, the candidate value of the maximum number of PUCCH repetitions the UE can transmit within a slot can be 2, 4, or 7. For example, when the number of repetitions within a slot exceeds the UE capability, the additional repetition(s) can be transmitted in the next available slot with the same time domain resource allocation as the repetitions not exceeding the capability.

Solution 2.3

In some embodiments, the minimum timing offset between PDSCH and PUCCH for hybrid automatic repeat request acknowledgement (HARQ-ACK) and/or between channel state information reference signal (CSI-RS)/synchronization signal block (SSB) measurement and the corresponding CSI reporting on the PUCCH is determined. For example, the minimum timing offset may be based on the first PUCCH transmission occasion. In another example, the minimum timing offset may be based on any PUCCH transmission occasion. In some embodiments, the minimum timing offset must satisfy the PUCCH minimum timing offset requirement; here, the UE will only transmit a PUCCH repetition occasion that satisfies this PUCCH minimum timing offset requirement.

Solution 2.4

In some embodiments, when there is a single PUCCH transmission occasion across the slot boundary, there are the following alternative solutions for repetition PUCCH transmission.

Alternative 1: the PUCCH repetition is allowed and is transmitted by the UE as usual.

Alternative 2: the repetition PUCCH is truncated (e.g., the symbol(s) of the original PUCCH exceeding the slot boundary is/are not transmitted in the repetition).

Alternative 3: the repetition PUCCH is segmented (e.g., the original PUCCH is split into two repetition PUCCHs, where the first repetition PUCCH contains all the symbols of the first slot and the second repetition PUCCH contains all the symbol(s) of the second slot).

Alternative 4: the whole PUCCH repetition is skipped.

Solution 2.5

In some embodiments, when a single PUCCH transmission occasion becomes invalid (e.g., it has at least one symbol configured as downlink (DL) symbol, its uplink transmission has been preempted, and/or it collides with other higher priority channels and is dropped), PUCCH repetition may be provided in accordance with one or more of the following alternatives.

Alternative 1: the repetition PUCCH is truncated where, for example, the symbols of the original PUCCH beyond a DL symbol of the original PUCCH are not transmitted.

Alternative 2: the repetition PUCCH is segmented based on a DL symbol of the original PUCCH where, for example, a first segment includes symbols up to the DL symbol and the second segment includes symbols after the DL symbol.

Alternative 3: the whole PUCCH repetition is skipped.

In some embodiments, PUCCH beam configuration is enhanced in accordance with one or more of the following solutions.

Solution 3.1

In some embodiments, when PUCCH repetition is configured, multiple beams (e.g. 2 beams) can be configured for PUCCH. For example, the configuring may specify the following beam patterns: a sequential pattern following the pattern {beam 1, beam 2, beam1, beam 2, . . . }; or a cyclical pattern following the pattern {beam 1, beam 1, beam2, beam 2, . . . }.

Solution 3.2

In some embodiments, DCI can explicitly indicate a PUCCH beam. For example, a new field in DCI can be introduced to configure the PUCCH beam. For example, the new field can include 1 or 2 quasi collocation (QCL) configuration(s). For example, when the new field includes 2 QCL configurations, 2 reference signals (RS) can be configured for QCL-TypeA or QCL-TypeD or both, and each RS can be a synchronization signal block (SSB), a channel state information reference signal (CSI-RS), or a sounding reference signal (SRS).

Solution 3.3

In some embodiments, the PUCCH-SpatialRelationInfo parameter can be enhanced to allow configuration of two PUCCH beams. For example, a PUCCH-SpatialRelation-Info code point can be configured such that it contains two PUCCH-SpatialRelationInfo parameters. For example, a single PUCCH-SpatialRelationInfo parameter can be configured to contain two beams (e.g., referenceSignal parameters).

Solution 3.4

Figure 12:
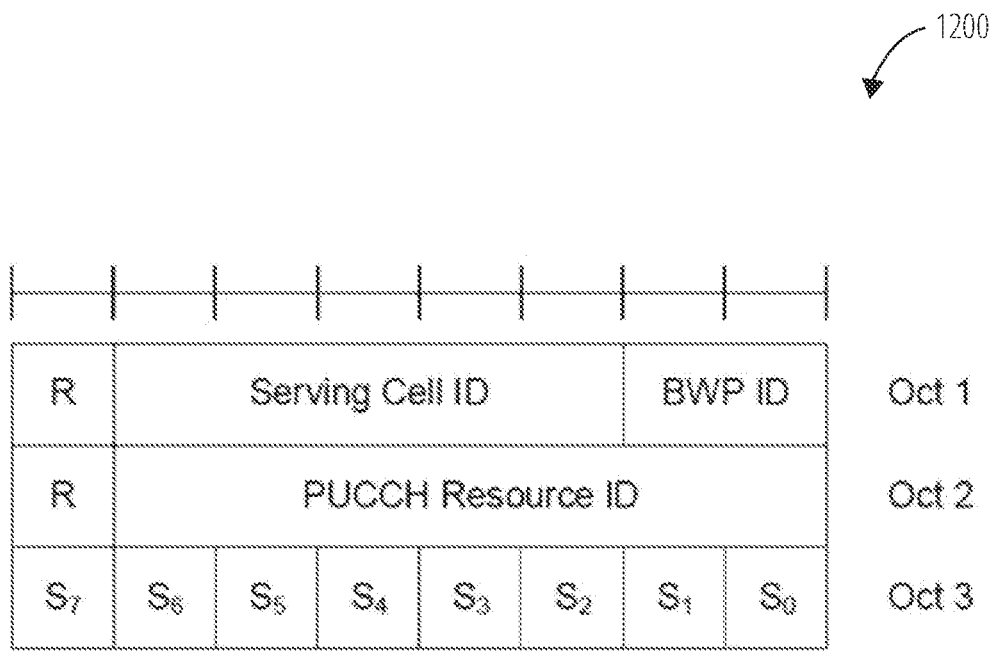
FIG. 12 illustrates a table for a media access control-control element (MAC-CE) according to some embodiments.

In some embodiments, a MAC-CE is allowed to activate two PUCCH spatial relations for a PUCCH resource. For example, this solution may change existing MAC-CE (shown as table 1200 in FIG. 12, which reflects FIG. 6.1.3.18-1 of 3GPP Release 16) as follows.

For example, an additional octet row (e.g., another S0 to S7) may be added below Oct 3 and used to configure a second PUCCH beam. Further, for example, for each octet row of the last two rows (e.g., Oct 3 and the additional octet row), only a single PUCCH spatial relation (e.g., PUCCH-SpatialRelationInfo parameter) may be activated. In another example, both rows can activate the same PUCCH spatial relation. In another example, both rows can activate different PUCCH spatial relations.

In some embodiments, a default beam may be used when a PUCCH-SpatialRelationInfo parameter is not provided in accordance with the following solution.

Solution 4.1

In some embodiments, a default beam may be provided in accordance with the following alternatives when a PUCCH-SpatialRelationInfo parameter is not provided and a UE is configured with PUCCH repetition. Alternative 1: Default to the PDSCH activated transmission configuration indicator (TCI) code point with the lowest index having two TCI states. Alternative 2: For each beam, default to each CORE-SETPoolIndex parameter CORESET with the lowest ID. Alternative 3: Default to PDSCH activated TCI code point with just the lowest ID. Alternative 4: Default to the CORE-SET with the lowest ID in the latest PDCCH monitoring slot.

The various solutions will now be explained in further detail and with reference to the accompanying figures. It should be noted that each of the solutions may be implemented by a UE (e.g., the UE performs one or more blocks of the disclosed processes), by a combination of the UE and other system components, or by system components other the UE, that the order of blocks described in the disclosed processes may be different than that shown in the figures, that one or more blocks of the disclosed processes may be combined with each other (including from different processes) and/or removed, and that processes may be combined with each other such that blocks from one or more processes are used with blocks of one or more other processes to form a combined process.

FIG. 1 illustrates a process 100 for configuring PUCCH repetition in accordance with some embodiments. In some embodiments, DCI can be used to configure the dynamic PUCCH repetition. For example, configuring DCI can configure the dynamic PUCCH repetition.

At block 102, multiple transmission and reception point (Multi-TRP) operation is determined. In some embodiments, a UE may determine that it is configured for multi-TRP operation and PUCCH. In some embodiments, a network may determine that a UE is configured for multi-TRP operation and PUCCH.

At block 104, PUCCH repetition is configured. In some embodiments, DCI is configured to configure the PUCCH repetition. In some embodiments, DCI is configured by using the DCI field "PDSCH-to-HARQ_feedback timing indicator." For example, a code point (e.g., one or more values, such as numerical values, that reflect a desired setting or parameter) may be configured for the DCI field "PDSCH-to-HARQ_feedback timing indicator." The code point may be configured in the dl-DataToUL-ACK parameter, dl-DataToUL-ACK-r16 parameter, or dl-DataToUL-ACKForDCIFormat1_2 parameter, of the PUCCH-Config parameter, for example. In some embodiments, the DCI field PDSCH-to-HARQ_feedback timing indicator is configured by radio resource control (RRC) to configure a number of transmissions of a PUCCH repetition (e.g., number of PUCCH repetitions). In some embodiments, for one or more of the code points, RRC configures the timing offset and/or the number of PUCCH repetitions. For example, this configuring of the timing offset and number of PUCCH repetitions may be at the same time. For example, the timing offset can be a value of the range 0 to 15. For example, the number of PUCCH repetitions can be a value of the range 1 to N, where N is at least greater than 8. In some embodiments, if the number of PUCCH repetitions is not configured, the number of repetitions is assumed to be 1. For example, the number of PUCCH repetitions can be the number of times a PUCCH repetition is transmitted.

In some embodiments, the DCI is configured to configure the PUCCH repetition by introducing or including a new DCI field. For example, the new DCI field can be the number of PUCCH repetitions. In some embodiments, the value of the new DCI field can be from 1 to N, where N is at least greater than 8. In some embodiments, if the new DCI field is not configured, the number of repetitions is assumed to be 1. For example, the number of PUCCH repetitions can be the number of times a PUCCH repetition is transmitted.

In some embodiments, the DCI is configured to configure the PUCCH repetition by configuring the DCI field "PUCCH resource indicator." For example, a configuration information element (IE) of the number of repetitions is used to configure the PUCCH resource indicator field. In some embodiments, the value of the number of repetitions and/or PUCCH resource indicator can be from 1 to N, where N is at least greater than 8. In some embodiments, when the value of the number of repetitions and/or PUCCH resource indicator is not configured, the value is assumed to be 1. For example, the number of PUCCH repetitions can be the number of times a PUCCH repetition is transmitted.

In some embodiments, the PUCCH repetition (e.g., PUCCH repetition enhancement) using DCI is restricted to certain PUCCH formats. For example, PUCCH may have one of the following formats: PUCCH Format 0: 1 to 2 symbols, 1 to 2 bits payload; PUCCH Format 1: greater than or equal to 4 symbols, 1 to 2 bits payload; PUCCH Format 2: 1 to 2 symbols, greater than 2 bits payload; PUCCH Format 3: greater than or equal to 4 symbols, greater than 2 bits payload; PUCCH Format 4: greater than or equal to 4 symbols, greater than 2 bits payload. In some embodiments, PUCCH repetition is only configured for one, a subset, or all of the above PUCCH formats. In some embodiments, PUCCH repetition is only configured for one, a subset, or all of PUCCH format 1, PUCCH format 3, and/or PUCCH format 4.

In some embodiments, multiple beams are configured in the PUCCH repetition configuration. For example, multiple beams (e.g., 2 beams) may be configured for PUCCH. In some embodiments, the multiple beams are configured in a pattern. For example, the pattern may be a sequential pattern, where a first beam and a second beam are configured for transmission according to the following pattern: {first beam, second beam, first beam, second beam, . . . and so on for a number of cycles}. In another example, the pattern may be a cyclical pattern, where a first beam and a second beam are configured for transmission according to the following pattern: {first beam, first beam, second beam, second beam, . . . and so on for a number of cycles}.

In some embodiments, DCI can explicitly indicate a PUCCH beam for the PUCCH repetition configuration. For example, a new field in DCI can be introduced to configure the PUCCH beam. For example, the new field can contain 1 or 2 quasi collocation (QCL) configuration(s). For example, when the new field contains 2 QCL configurations, 2 reference signals (RS) can be configured for QCL-TypeA or QCL-TypeD or both, and each RS can be a synchronization signal block (SSB), a channel state information reference signal (CSI-RS), or a sounding reference signal (SRS).

In some embodiments, the PUCCH-SpatialRelationInfo parameter can be enhanced to allow configuration of two PUCCH beams for the PUCCH repetition configuration. For example, a PUCCH-SpatialRelationInfo code point can be configured such that it contains two PUCCH-SpatialRelationInfo parameters. For example, a single PUCCH-SpatialRelationInfo parameter can be configured to contain two beams (e.g., referenceSignal parameters).

In some embodiments, a MAC-CE is allowed to activate two PUCCH spatial relations for a PUCCH resource (e.g., for PUCCH repetition configuration). For example, this solution may change existing MAC-CE (shown as table 1200 in FIG. 12, which reflects FIG. 6.1.3.18-1 of 3GPP Release 16) as follows.

In some embodiments, an additional octet row S0 to S7 is be added below Oct 3 and used to configure a second PUCCH beam. In some embodiments, for each octet row of the last two rows (e.g., Oct 3 and the additional octet row), only a single PUCCH spatial relation (e.g., PUCCH-SpatialRelationInfo parameter) may be activated. In another example, both rows can activate the same PUCCH spatial relation. In another example, both rows can activate different PUCCH spatial relations.

In some embodiments, a default beam is used when a PUCCH-SpatialRelationInfo parameter is not provided. In some embodiments, a default beam may be provided in accordance with the following alternatives when a PUCCH-SpatialRelationInfo parameter is not provided and a UE is configured with PUCCH repetition. In some embodiments, in alternative 1, each beam defaults to the PDSCH activated transmission configuration indicator (TCI) code point with the lowest index having two TCI states. In some embodiments, in alternative 2, each beam defaults to each CORESETPoolIndex parameter CORESET with the lowest ID. In some embodiments, in alternative 3, each beam defaults to a PDSCH activated TCI code point with just the lowest ID. In some embodiments, in alternative 4, each beam defaults to the CORESET with the lowest ID in the latest PDCCH monitoring slot.

At block 106, one or more PUCCH repetitions are transmitted according to the configuring/configuration of the PUCCH repetition.

Figure 2:
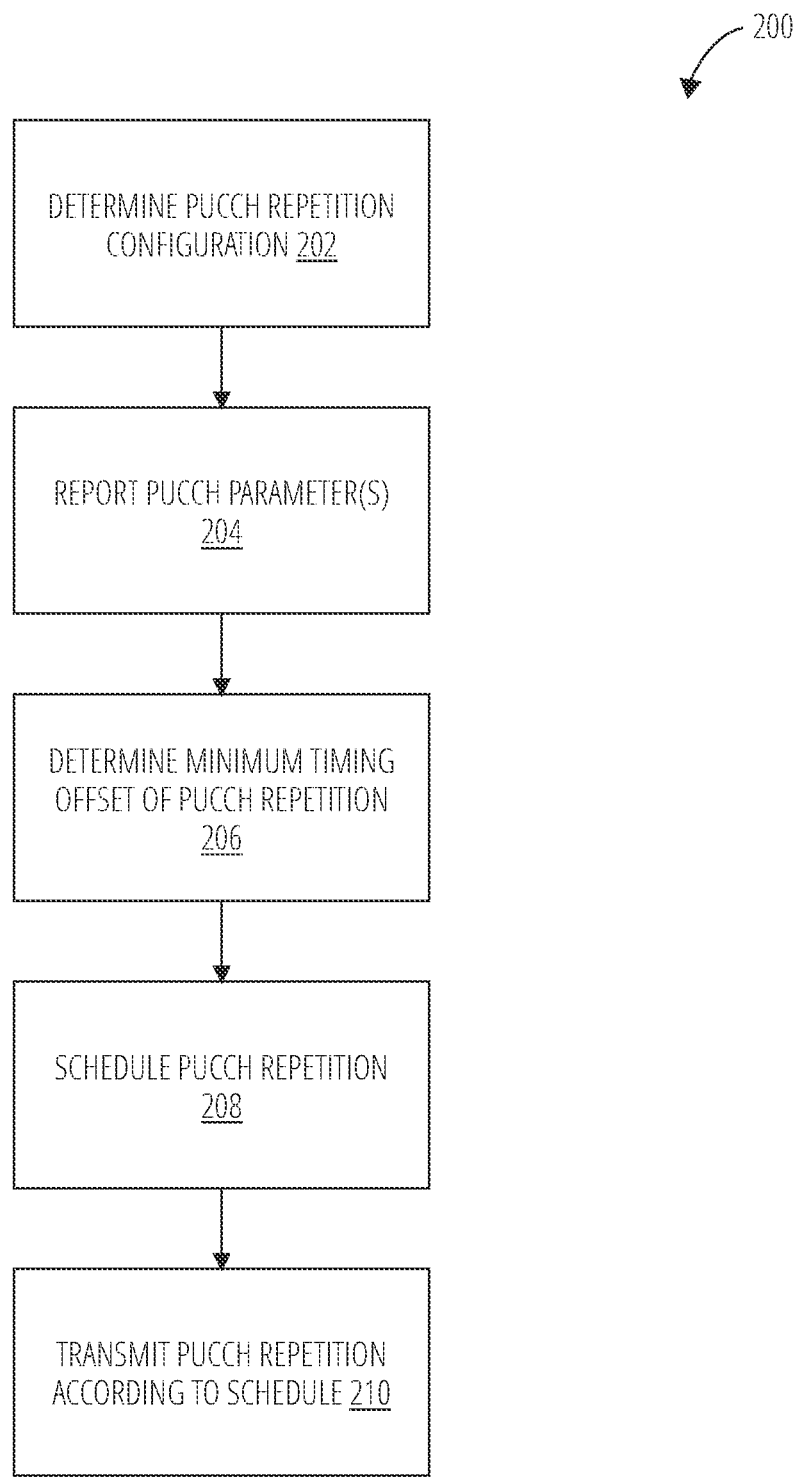
FIG. 2 illustrates a process for configuring PUCCH repetition scheduling in accordance with some embodiments.

FIG. 2 illustrates a process 200 for configuring PUCCH repetition scheduling in accordance with some embodiments.

At block 202, PUCCH repetition configuration is determined. In some embodiments, a UE determines that it is configured for PUCCH repetition. In some embodiments, a network determines that a UE is configured for PUCCH repetition. In some embodiments, the PUCCH repetition is configured as discussed in block 104.

At block 204, PUCCH repetition parameter(s) is reported. In some embodiments, a UE configured for PUCCH repetition reports or transmits to a network PUCCH repetition parameter(s). For example, the UE may report the maximum number of PUCCH repetitions that the UE can or is configured to transmit within a slot. In some embodiments, the candidate value of the number of repetitions is 2, 4, or 7. In some embodiments, when the number of repetitions within a slot exceeds the UE's capability, the additional repetition(s) are transmitted in the next available slot. In some embodiments, these additional repetition(s) are transmitted in the next available slot with the same time domain resource allocation as the repetitions not exceeding the capability. In some embodiments, the next available slot is an adjacent slot to the current slot. In some embodiments, the next available slot is not adjacent to the current slot and is located one or more slots away from the current slot.

At block 206, minimum timing offset of the PUCCH repetition is determined. In some embodiments, the minimum timing offset determines when a first PUCCH can be scheduled. In some embodiments, the minimum timing offset is between a PDSCU and its respective PUCCH for a HARQ-ACK and reflects a minimum HARQ-ACK processing time. In some embodiments, the minimum timing offset is between the CSI-RS/SSB measurement and the corresponding CSI reporting on PUCCH.

In some embodiments, the minimum timing offset is based on the first PUCCH transmission occasion. In some embodiments, the minimum timing offset is based on any PUCCH transmission occasion. In some embodiments, the minimum timing offset must satisfy the PUCCH minimum timing offset requirement. For example, the UE will only transmit a PUCCH repetition occasion that satisfies this PUCCH minimum timing offset requirement.

As noted, in some embodiments, the minimum timing offset reflects a minimum HARQ-ACK processing time. In some embodiments, a first PUCCH repetition occasion satisfies the minimum HARQ-ACK processing time associated with a PDSCH. In some embodiments, the first or any other PUCCH repetition occasion satisfies the minimum HARQ-ACK processing time associated with a PDSCH. In some embodiments, a UE is not required to transmit the PUCCH repetition occasion(s) that do not satisfy the minimum HARQ-ACK processing time associated with a PDSCH. In some embodiments, the UE transmits the PUCCH repetition occasion(s) that satisfy the minimum HARQ-ACK processing time associated with a PDSCH.

FIG. 3A illustrates a diagram 300 showing an example minimum timing offset that reflects the minimum HARQ-ACK processing time 302 for a PDSCH 304 in accordance with some embodiments. In diagram 300. PUCCH 306, 308, 310, and 312 are PUCCH transmissions that may occur for PDSCH 304. As shown by diagram 300, the minimum HARQ-ACK processing time 302 extends from PDSCH 304 (e.g., from after the last symbol of PDSCH 304) through part of slot 4. Accordingly, in the example shown, PUCCH 306 and 308 do not satisfy the minimum timing offset because they located within the minimum HARQ-ACK processing time 302. PUCCH 306 and 308 therefore may not be the first PUCCH transmission after PDSCH 304. In the example shown, PUCCH 310 and 312 comply with the minimum timing offset because they are located in slots 5 and 6, which are after the slots 1, 2, 3, and 4 that are covered by the minimum HARQ-ACK processing time 302. Thus, the first PUCCH transmission after PDSCH 304 may be PUCCH 310 since it complies with the minimum timing offset, and the repeated PUCCH may be PUCCH 312.

Returning to FIG. 2, at block 208. PUCCH repetition is scheduled. In some embodiments, the scheduled PUCCH repetition complies with the minimum timing offset of the PUCCH repetition. In some embodiments, the PUCCH repetition scheduling provides that the UE is allowed to operate in a first repetition mode and/or a second repetition mode. FIG. 3B illustrates a diagram 314 showing the first repetition mode and the second repetition mode in accordance with some embodiments. In the first repetition mode, PUCCH repetitions are repeated back to back. In some embodiments, a constant may also be configured between the PUCCH repetitions. In some embodiments, the back to back repetitions overlap one or more slot boundaries. As shown in diagram 314, in the first repetition mode 316, PUCCH repetitions 318, 320, 322, and 324 are repeated back to back and overlap boundaries between slots 1, 2, and 3. In the second repetition mode, PUCCH repetitions are repeated in consecutive slots and one or more slot boundaries are not overlapped by PUCCH. In some embodiments, the repetitions may use the same time domain allocation within each slot. As shown in diagram 314, in the second repetition mode 326, the PUCCH repetitions 328, 330, 332, and 334 are repeated in consecutive slots and slots are not overlapped by PUCCH.

At block 210, one or more PUCCH repetitions are transmitted according to the schedule/scheduled PUCCH repetition.

Figure 4:
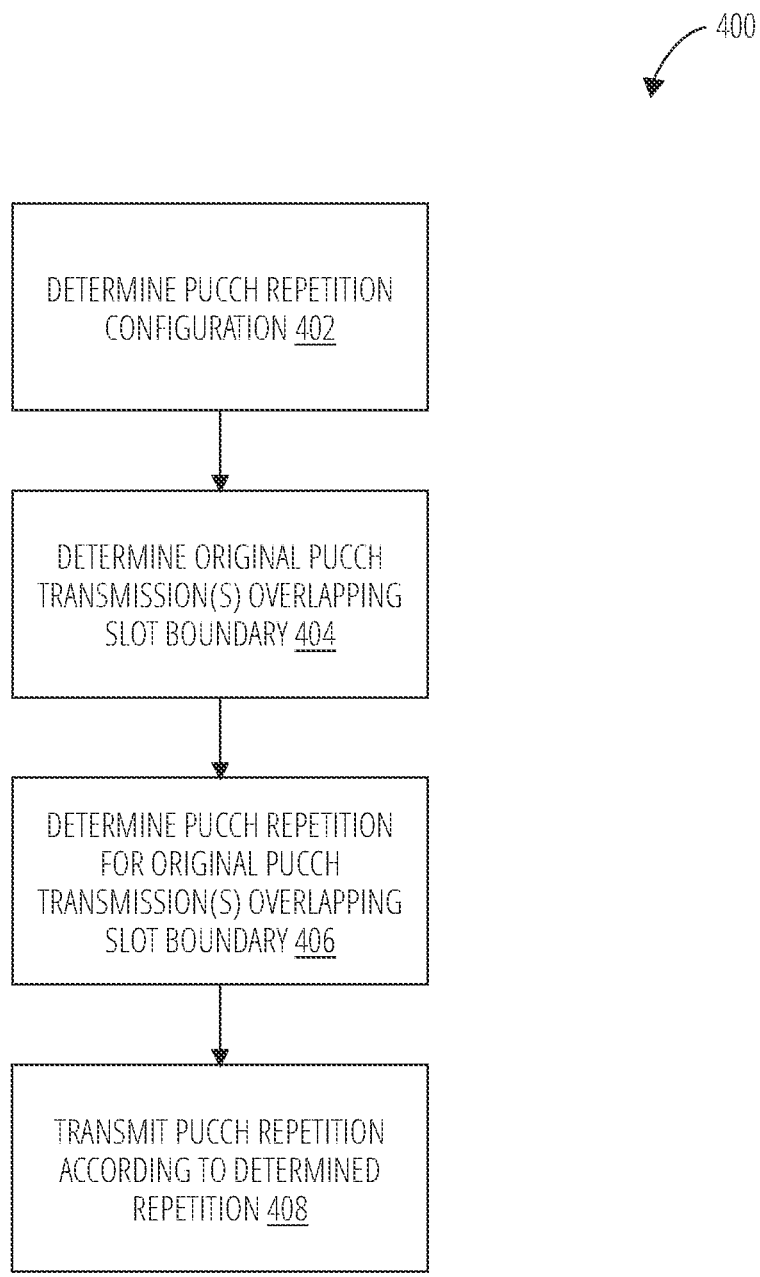
FIG. 4 illustrates a process for PUCCH repetition in accordance with some embodiments.

FIG. 4 illustrates a process 400 for PUCCH repetition in accordance with some embodiments. At block 402, PUCCH repetition configuration is determined. In some embodiments, a UE determines that it is configured for PUCCH repetition. In some embodiments, a network determines that a UE is configured for PUCCH repetition. In some embodiments, this block may be the same or similar to block 202. In some embodiments, the PUCCH repetition is configured as discussed in block 104.

At block 404, original PUCCH transmission(s) that overlap slot a boundary is/are determined. For example, a slot boundary may be a boundary between a first slot for PUCCH transmission and a second slot for PUCCH transmission. In some embodiments, an original PUCCH transmission overlaps a single slot boundary. In some embodiments, an original PUCCH transmission overlaps one or more slot boundaries. In some embodiments, am original PUCCH transmission overlaps two or more slot boundaries.

Figure 5:
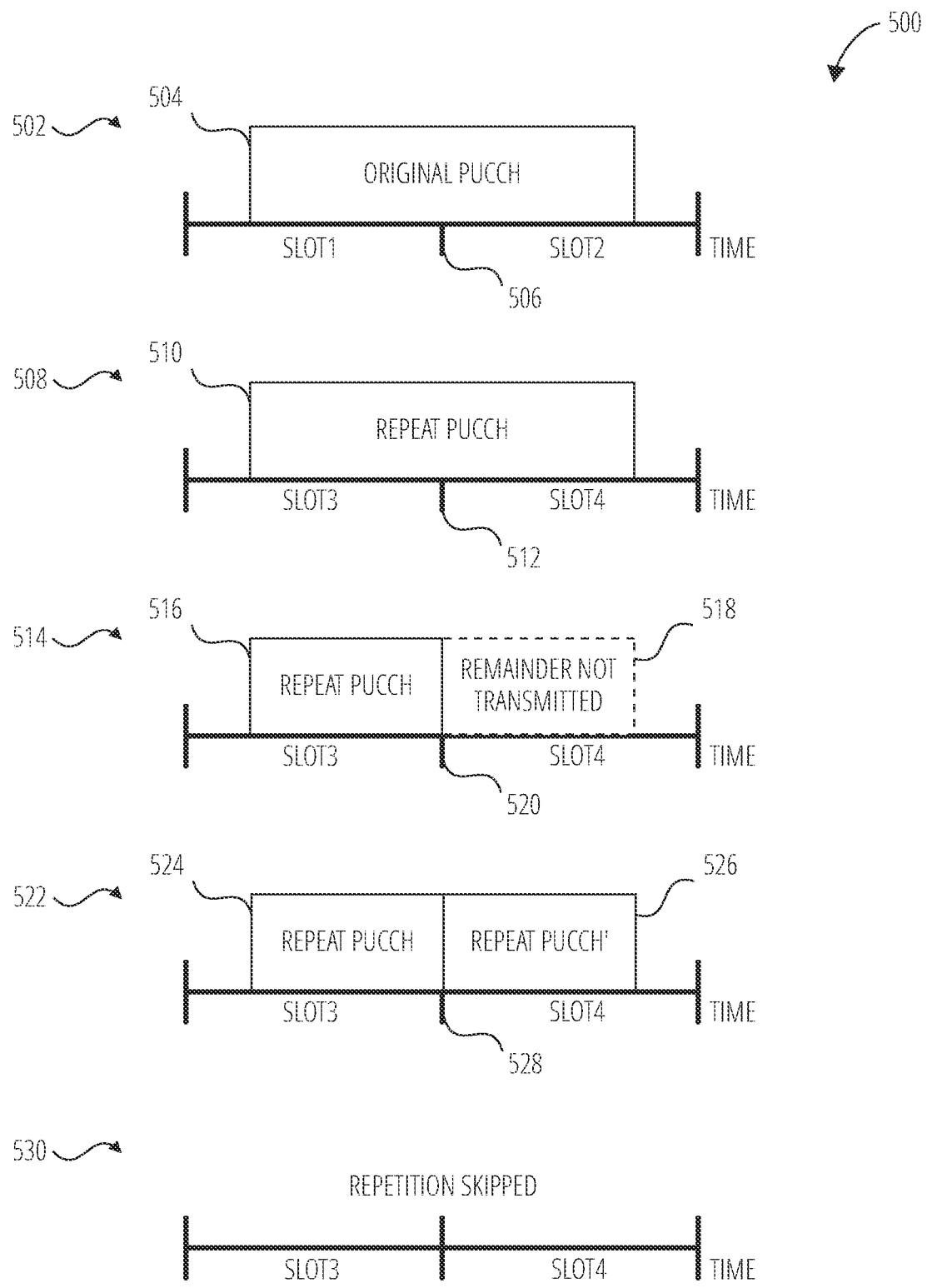
FIG. 5 illustrates a diagram showing PUCCH repetition solutions in accordance with some embodiments.

At block 406, a PUCCH repetition technique for the original PUCCH transmission(s) overlapping one or more slot boundaries is determined. Various PUCCH repetition techniques/solutions in accordance with some embodiments are shown in the diagram 500 of FIG. 5. For example, diagram 502 of FIG. 5 illustrates an original PUCCH 504 that overlaps slot boundary 506 between a slot 1 and a slot 2.

In some embodiments, the PUCCH repetition is a repeat of the original PUCCH transmission. In solution 508, the PUCCH repetition 510 is allowed and is transmitted by the UE in slots 3 and 4 and across the boundary 512 between slots 3 and 4 (e.g., the repetition 510 overlaps the boundary 512). The PUCCH repetition 510 is a repetition of original PUCCH 504 and includes all symbols of PUCCH 504.

In some embodiments, the PUCCH repetition is a truncated version of the original PUCCH transmission. For example, in solution 514, one or more or all of the symbol(s) of the original PUCCH 504 exceeding or overlapping the slot boundary 506 is/are not transmitted in the repetition. Thus, the one or more symbols that are transmitted in the repetition are in repetition PUCCH 516, and the truncated, remainder symbol(s) 518 of original PUCCH 504 located after slot boundary 520 are not transmitted in the repetition.

In some embodiments, the PUCCH repetition is a segmented version of the original PUCCH transmission. For example, in solution 522, the original PUCCH 504 is segmented into a repeat PUCCH 524 and a repeat PUCCH' 526 for the repetition, where the segmentation takes place at slot boundary 528. Here, the repeat PUCCH 524 includes one or more or all symbols of the original PUCCH 504 from slot 1, and the repeat PUCCH' 526 includes one or more or all symbols of the original PUCCH 504 from slot 2.

In some embodiments, the PUCCH repetition is skipped, as shown in solution 530 of FIG. 5. For example, the PUCCH repetition may be generated, but may not be sent. In another example, the PUCCH repetition is not generated at all.

Returning to FIG. 4, at block 408, one or more PUCCH repetitions are transmitted according to the determined repetition. If the PUCCH repetition is skipped, no PUCCH repetition is transmitted.

Figure 6:
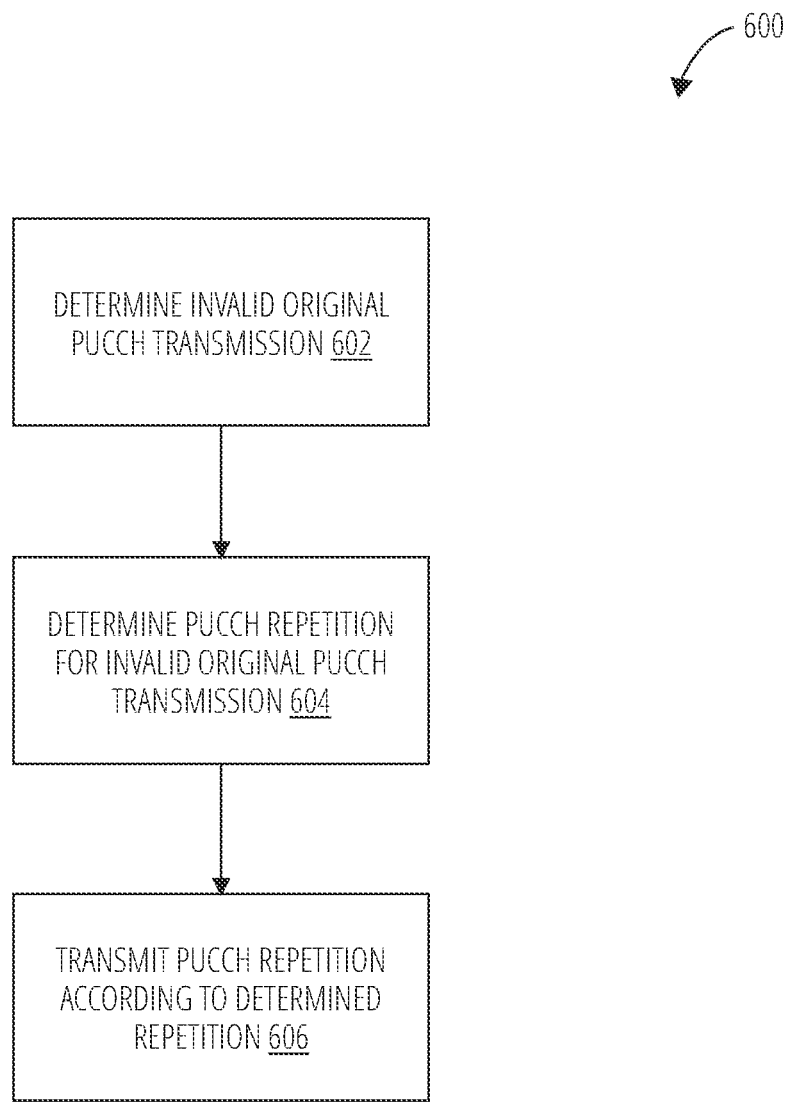
FIG. 6 illustrates another process for PUCCH repetition in accordance with some embodiments.

FIG. 6 illustrates a process 600 for PUCCH repetition in accordance with some embodiments. At block 602, an invalid original PUCCH transmission is determined. For example, the determination may include one or more of determining that the original PUCCH transmission has at least one symbol configured as downlink (DL) symbol, determining that the original PUCCH transmission has a preempted uplink transmission, and/or determining that the original PUCCH transmission collides with one or more other higher priority channels and is dropped.

At block 604, PUCCH repetition for the determined invalid original PUCCH transmission is determined. PUCCH repetition solutions according to some embodiments are shown in the diagram 700 of FIG. 7. In some embodiments, an original PUCCH includes one or more downlink (DL) symbols. For example, diagram 702 illustrates an original PUCCH 704 that includes a DL symbol 706. While original PUCCH 704 is crossing spanning a slot boundary between slot 1 and slot 2, it need not cross a slot boundary and may be contained to a single slot.

In some embodiments, the PUCCH repetition is a truncated version of the original PUCCH based on the location of the DL symbol in the original PUCCH. For example, in solution 708, the repetition PUCCH 710 includes the symbols of the original PUCCH 704 through the DL symbol 706, where DL symbol 706 is represented by DL 712 in the repetition PUCCH 710. No symbols of the original PUCCH 704 located beyond or after the DL symbol 706 are transmitted in the repetition PUCCH 710. In some embodiments, the DL 712 is not included in the repetition PUCCH 710.

In some embodiments, the PUCCH repetition is a segmented version of the original PUCCH based on the location of the DL symbol in the original PUCCH. For example, in solution 714, a first segment repetition PUCCH 716 includes symbols located up to (e.g., before) and not including the DL symbol 706 in the original PUCCH 704, and a second segment repetition PUCCH 720 includes symbols located after and not including the DL symbol 706 in the original PUCCH 704. The region 718 reflects where the DL symbol 706 of the original PUCCH 704 would have been located in the repetition if included. In some embodiments, the DL symbol is included in one or both of the first segment repetition PUCCH 716 and/or the second segment repetition PUCCH 720.

Figure 7:
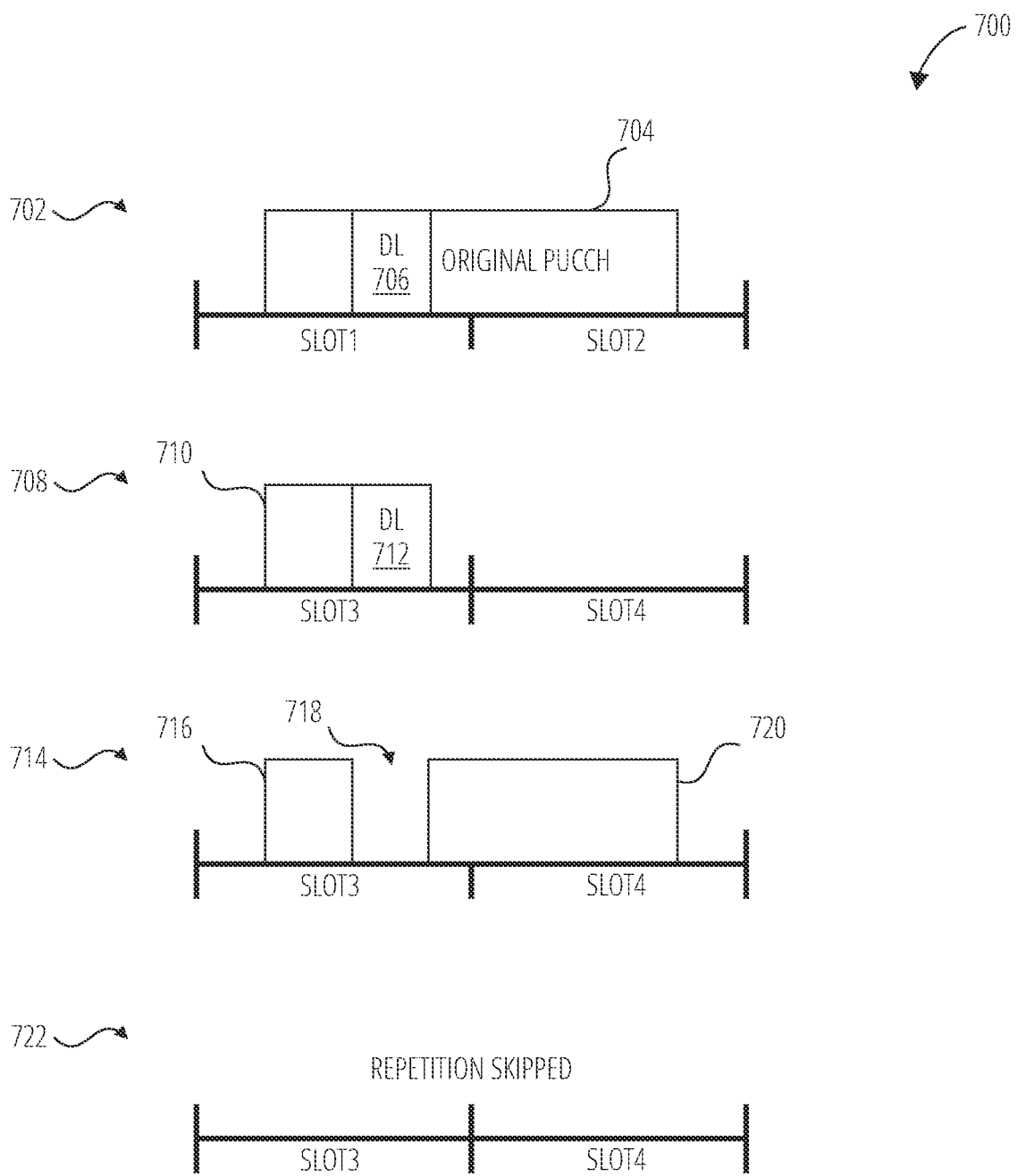
FIG. 7 illustrates another diagram showing PUCCH repetition solutions in accordance with some embodiments.

In some embodiments, the PUCCH repetition is skipped, as shown in solution 722 of FIG. 7. For example, the PUCCH repetition may be generated, but may not be sent. In another example, the PUCCH repetition is not generated at all.

Returning to FIG. 6, at block 606, one or more PUCCH repetitions are transmitted according to the determined repetition. If the PUCCH repetition is skipped, no PUCCH repetition is transmitted.

Figure 8:
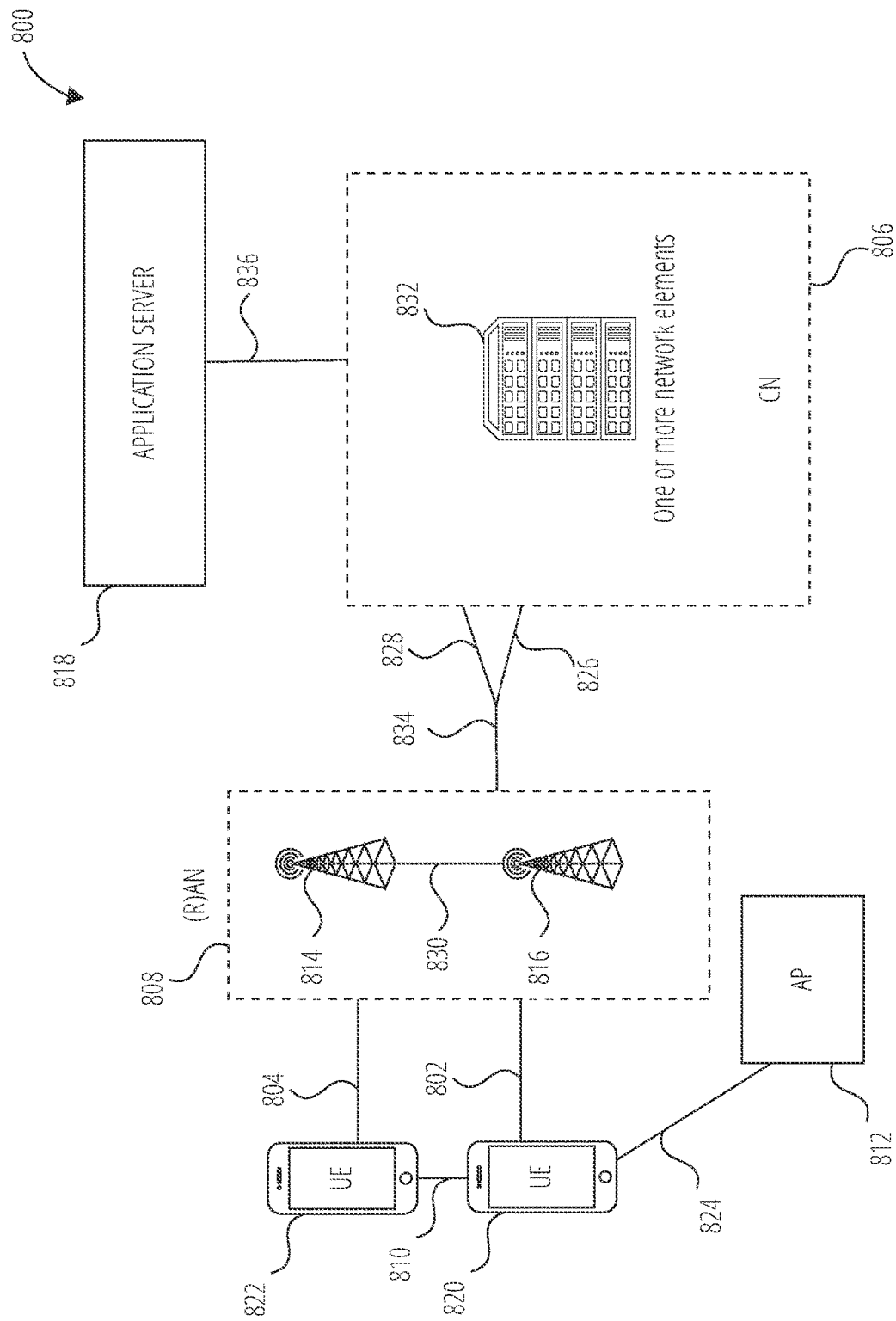
FIG. 8 illustrates an example architecture of a system of a network, in accordance with some embodiments.

FIG. 8 illustrates an example architecture of a system 800 of a network, in accordance with various embodiments. The following description is provided for an example system 800 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 8, the system 800 includes UE 822 and UE 820. In this example, the UE 822 and the UE 820 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 822 and/or the UE 820 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 822 and UE 820 may be configured to connect, for example, communicatively couple, with an access node or radio access node (shown as (R)AN 808). In embodiments, the (R)AN 808 may be an NG RAN or a SG RAN, an E-UTRAN, or a legacy RAN, such as a UTRAN or GERAN. As used herein, the term "NG RAN" or the like may refer to a (R)AN 808 that operates in an NR or SG system, and the term "E-UTRAN" or the like may refer to a (R)AN 808 that operates in an LTE or 4G system. The UE 822 and UE 820 utilize connections (or channels) (shown as connection 804 and connection 802, respectively), each of which comprises a physical communications interface or layer (discussed in further detail below).

In this example, the connection 804 and connection 802 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 822 and UE 820 may directly exchange communication data via a ProSe interface 810. The ProSe interface 810 may alternatively be referred to as a sidelink (SL) interface 110 and may comprise one or more logical channels, including but not limited to a PSCCH, a PSSCH, a PSDCH, and a PSBCH.

The UE 820 is shown to be configured to access an AP 812 (also referred to as "WLAN node," "WLAN," "WLAN Termination," "WT" or the like) via connection 824. The connection 824 can comprise a local wireless connection, such as a connection consistent with any IEEE 802.11 protocol, wherein the AP 812 would comprise a wireless fidelity (Wi-Fi®) router. In this example, the AP 812 may be connected to the Internet without connecting to the core network of the wireless system (described in further detail below). In various embodiments, the UE 820, (R)AN 808, and AP 812 may be configured to utilize LWA operation and/or LWIP operation. The LWA operation may involve the UE 820 in RRC_CONNECTED being configured by the RAN node 814 or the RAN node 816 to utilize radio resources of LTE and WLAN. LWIP operation may involve the UE 820 using WLAN radio resources (e.g., connection 824) via IPsec protocol tunneling to authenticate and encrypt packets (e.g., IP packets) sent over the connection 824. IPsec tunneling may include encapsulating the entirety of original IP packets and adding a new packet header, thereby protecting the original header of the IP packets.

The (R)AN 808 can include one or more AN nodes, such as RAN node 814 and RAN node 816, that enable the connection 804 and connection 802. As used herein, the terms "access node," "access point." or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 800 (e.g., an cNB). According to various embodiments, the RAN node 814 or RAN node 816 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 814 or RAN node 816 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 814 or RAN node 816); a MAC/PHY split wherein RRC, PDCP, RLC, and MAC layers are operated by the CRAN/vBBUP and the PHY layer is operated by individual RAN nodes (e.g., RAN node 814 or RAN node 816); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 814 or RAN node 816 to perform other virtualized applications. In some implementations, an individual RAN node may represent individual gNB-DUs that are connected to a gNB-CU via individual F1 interfaces (not shown by FIG. 8). In these implementations, the gNB-DUs may include one or more remote radio heads or RFEMs, and the gNB-CU may be operated by a server that is located in the (R)AN 808 (not shown) or by a server pool in a similar manner as the CRAN/vBBUP. Additionally, or alternatively, one or more of the RAN node 814 or RAN node 816 may be next generation eNBs (ng-eNBs), which are RAN nodes that provide E-UTRA user plane and control plane protocol terminations toward the UE 822 and UE 820, and are connected to an SGC via an NG interface (discussed infra). In V2X scenarios one or more of the RAN node 814 or RAN node 816 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU." an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 814 and/or the RAN node 816 can terminate the air interface protocol and can be the first point of contact for the UE 822 and UE 820. In some embodiments, the RAN node 814 and/or the RAN node 816 can fulfill various logical functions for the (R)AN 808 including, but not limited to, radio network controller (RNC) functions such as radio bearer management, uplink and downlink dynamic radio resource management and data packet scheduling, and mobility management.

In embodiments, the UE 822 and UE 820 can be configured to communicate using OFDM communication signals with each other or with the RAN node 814 and/or the RAN node 816 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 814 and/or the RAN node 816 to the UE 822 and UE 820, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 822 and UE 820 and the RAN node 814 and/or the RAN node 816 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 822 and UE 820 and the RAN node 814 or RAN node 816 may operate using LAA, eLAA, and/or feLAA mechanisms. In these implementations, the UE 822 and UE 820 and the RAN node 814 or RAN node 816 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 822 and UE 820, RAN node 814 or RAN node 816, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 822, AP 812, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 822 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 822 and UE 820. The PDCCH carries information about the transport format and resource allocations related to the PDSCH channel, among other things. It may also inform the UE 822 and UE 820 about the transport format, resource allocation, and HARQ information related to the uplink shared channel. Typically, downlink scheduling (assigning control and shared channel resource blocks to the UE 820 within a cell) may be performed at any of the RAN node 814 or RAN node 816 based on channel quality information fed back from any of the UE 822 and UE 820. The downlink resource assignment information may be sent on the PDCCH used for (e.g., assigned to) each of the UE 822 and UE 820.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level. L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 814 or RAN node 816 may be configured to communicate with one another via interface 830. In embodiments where the system 800 is an LTE system (e.g., when CN 806 is an EPC), the interface 830 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 822 from an SeNB for user data, information of PDCP PDUs that were not delivered to a UE 822; information about a current minimum desired buffer size at the Sc NB for transmitting to the UE user data: and the like. The X2-C may provide intra-LTE access mobility functionality, including context transfers from source to target eNBs, user plane transport control, etc.; load management functionality; as well as inter-cell interference coordination functionality.

In embodiments where the system 800 is a SG or NR system (e.g., when CN 806 is an SGC), the interface 830 may be an Xn interface. The Xn interface is defined between two or more RAN nodes (e.g., two or more gNBs and the like) that connect to SGC, between a RAN node 814 (e.g., a gNB) connecting to SGC and an eNB, and/or between two eNBs connecting to 5GC (e.g., CN 806). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 822 in a connected mode (e.g., CM-CONNECTED) including functionality to manage the UE mobility for connected mode between one or more RAN node 814 or RAN node 816. The mobility support may include context transfer from an old (source) serving RAN node 814 to new (target) serving RAN node 816; and control of user plane tunnels between old (source) serving RAN node 814 to new (target) serving RAN node 816. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 808 is shown to be communicatively coupled to a core network-in this embodiment, CN 806. The CN 806 may comprise one or more network elements 832, which are configured to offer various data and telecommunications services to customers/subscribers (e.g., users of UE 822 and UE 820) who are connected to the CN 806 via the (R)AN 808. The components of the CN 806 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 806 may be referred to as a network slice, and a logical instantiation of a portion of the CN 806 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 818 may be an element offering applications that use IP bearer resources with the core network (e.g., UMTS PS domain, LTE PS data services, etc.). The application server 818 can also be configured to support one or more communication services (e.g., VoIP sessions, PTT sessions, group communication sessions, social networking services, etc.) for the UE 822 and UE 820 via the EPC. The application server 818 may communicate with the CN 806 through an IP communications interface 836.

In embodiments, the CN 806 may be an SGC, and the (R)AN 116 may be connected with the CN 806 via an NG interface 834. In embodiments, the NG interface 834 may be split into two parts, an NG user plane (NG-U) interface 826, which carries traffic data between the RAN node 814 or RAN node 816 and a UPF, and the S1 control plane (NG-C) interface 828, which is a signaling interface between the RAN node 814 or RAN node 816 and AMFs.

In embodiments, the CN 806 may be a SG CN, while in other embodiments, the CN 806 may be an EPC). Where CN 806 is an EPC, the (R)AN 116 may be connected with the CN 806 via an S1 interface 834. In embodiments, the S1 interface 834 may be split into two parts, an S1 user plane (S1-U) interface 826, which carries traffic data between the RAN node 814 or RAN node 816 and the S-GW, and the S1-MME interface 828, which is a signaling interface between the RAN node 814 or RAN node 816 and MMEs.

Figure 9:
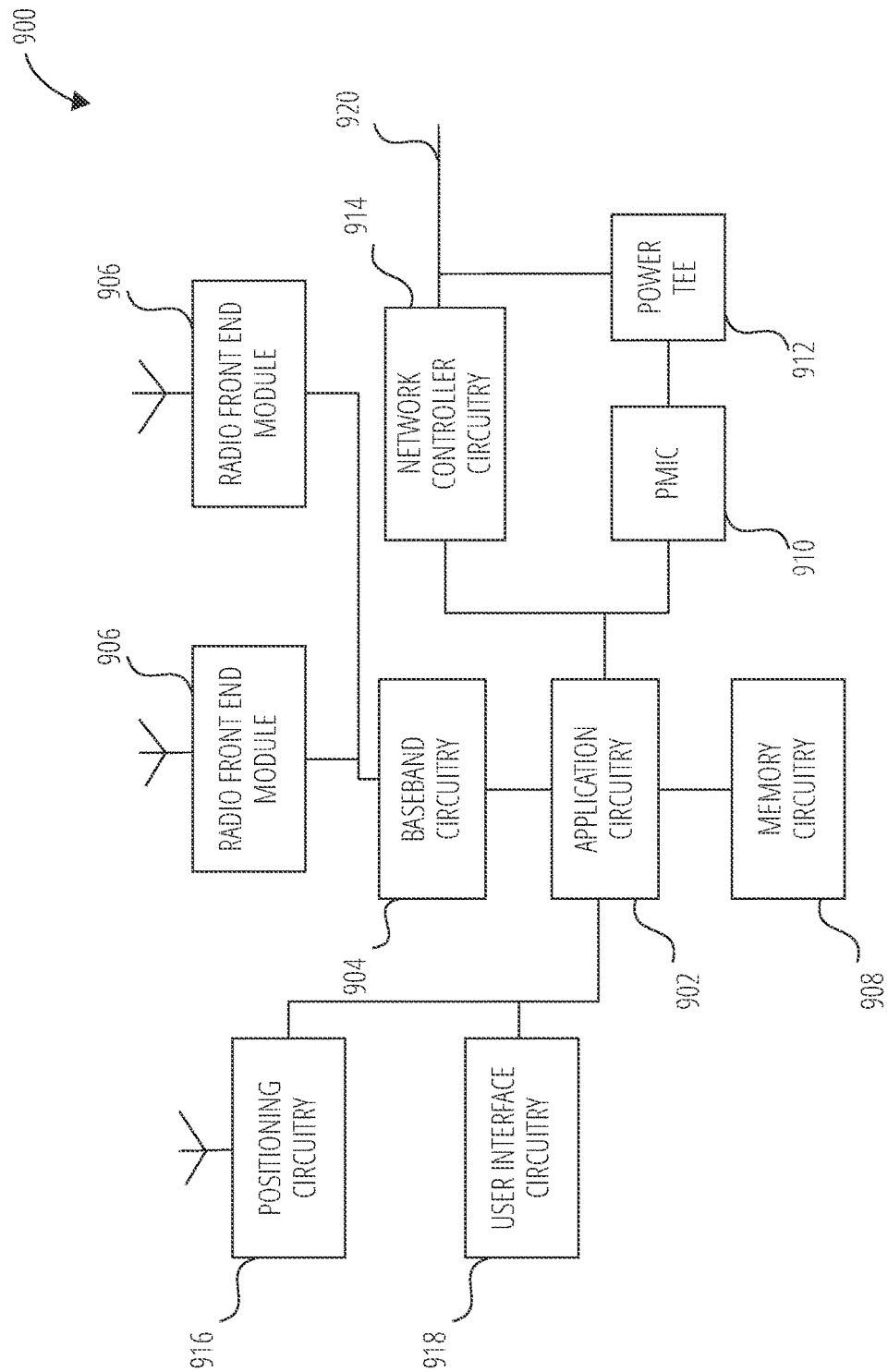
FIG. 9 illustrates an infrastructure equipment in accordance with some embodiments.

FIG. 9 illustrates an example of infrastructure equipment 900 in accordance with various embodiments. The infrastructure equipment 900 may be implemented as a base station, radio head, RAN node, AN, application server, and/or any other element/device discussed herein. In other examples, the infrastructure equipment 900 could be implemented in or by a UE.

The infrastructure equipment 900 includes application circuitry 902, baseband circuitry 904, one or more radio front end module 906 (RFEM), memory circuitry 908, power management integrated circuitry (shown as PMIC 910), power tee circuitry 912, network controller circuitry 914, network interface connector 920, satellite positioning circuitry 916, and user interface circuitry 918. In some embodiments, the device infrastructure equipment 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 902 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 902 may be coupled with or may include memory/storage elements and may be configured to execute instructions stored in the memory/storage to enable various applications or operating systems to run on the infrastructure equipment 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 902 may comprise, or may be, a special-purpose processor/controller to operate according to the various embodiments herein. As examples, the processor(s) of application circuitry 902 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 900 may not utilize application circuitry 902, and instead may include a special-purpose processor/controller to process IP data received from an EPC or 5GC, for example.

In some implementations, the application circuitry 902 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like: programmable SoCs (PSoCs); and the like. In such implementations, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like. The baseband circuitry 904 may be implemented, for example, as a solder-down substrate including one or more integrated circuits, a single packaged integrated circuit soldered to a main circuit board or a multi-chip module containing two or more integrated circuits.

The user interface circuitry 918 may include one or more user interfaces designed to enable user interaction with the infrastructure equipment 900 or peripheral component interfaces designed to enable peripheral component interaction with the infrastructure equipment 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D)cross-point (XPOINT) memories from Intel® and Micron®. The memory circuitry 908 may be implemented as one or more of solder down packaged integrated circuits, socketed memory modules and plug-in memory cards.

The PMIC 910 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 912 may provide for electrical power drawn from a network cable to provide both power supply and data connectivity to the infrastructure equipment 900 using a single cable.

The network controller circuitry 914 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 920 using a physical connection, which may be electrical (commonly referred to as a "copper interconnect"), optical, or wireless. The network controller circuitry 914 may include one or more dedicated processors and/or FPGAs to communicate using one or more of the aforementioned protocols. In some implementations, the network controller circuitry 914 may include multiple controllers to provide connectivity to other networks using the same or different protocols.

The positioning circuitry 916 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-Technology for Positioning, Navigation, and Timing (Micro-PNT) IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure, or the like. The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies.

The bus/IX may be a proprietary bus, for example, used in a SoC based system. Other bus/IX systems may be included, such as an I²C interface, an SPI interface, point to point interfaces, and a power bus, among others.

Figure 10:
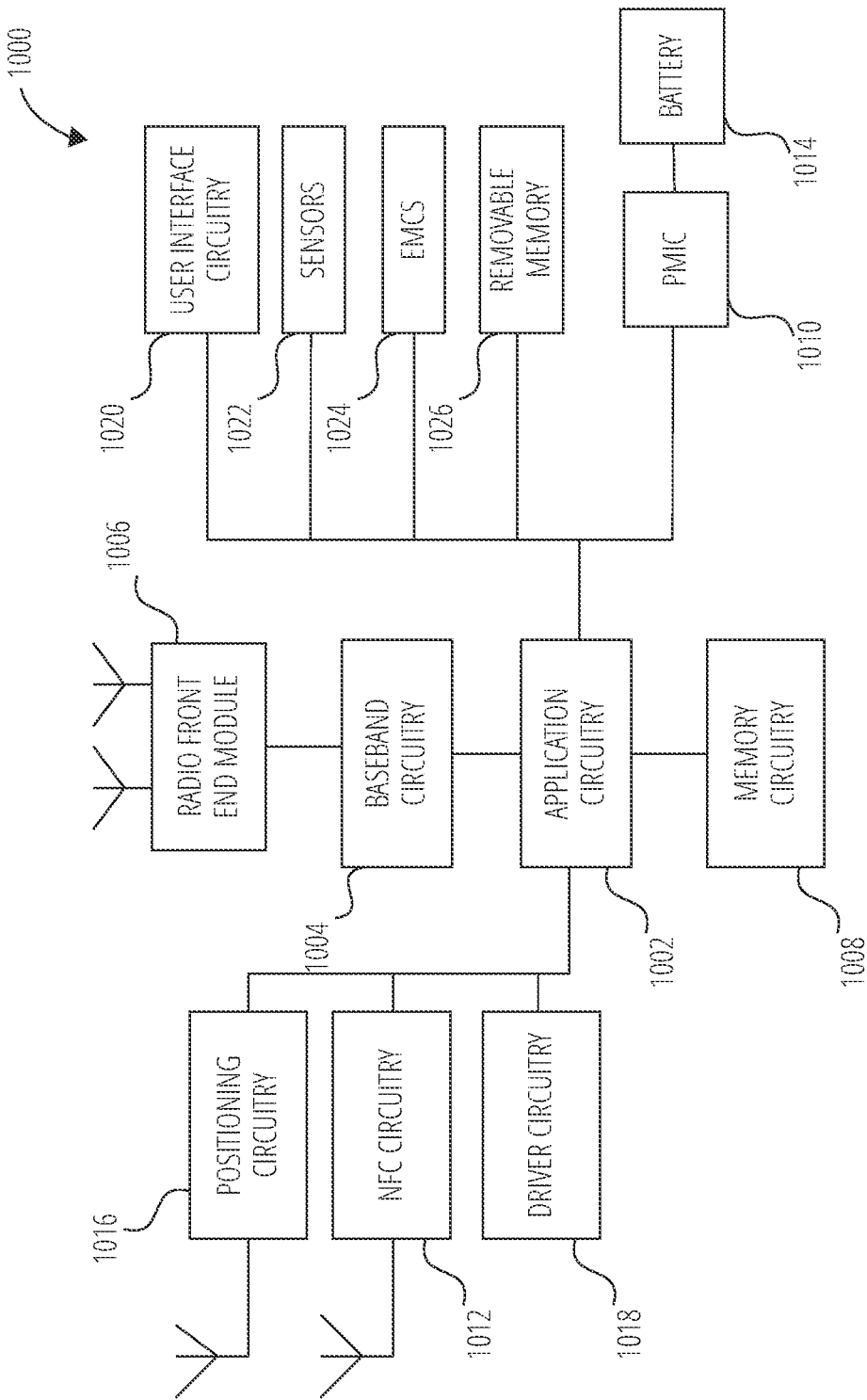
FIG. 10 illustrates a platform in accordance with some embodiments.

FIG. 10 illustrates an example of a platform 1000 in accordance with various embodiments. In embodiments, the computer platform 1000 may be suitable for use as UEs, application servers, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1002 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1002 may be coupled with or may include memory/storage elements and may be configured to execute instructions stored in the memory/storage to enable various applications or operating systems to run on the platform 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1002 may comprise, or may be, a special-purpose processor/controller to operate according to the various embodiments herein.

As examples, the processor(s) of application circuitry 1002 may include an Intel® Architecture Corer™ based processor, such as a Quark™, an Atom™, an i3, an i5, an i7, or an MCU-class processor, or another such processor available from Intel® Corporation. The processors of the application circuitry 1002 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors, an ARM-based design licensed from ARM Holdings, Ltd., such as the ARM Cortex-A, Cortex-R, and Cortex-M family of processors; or the like. In some implementations, the application circuitry 1002 may be a part of a system on a chip (SoC) in which the application circuitry 1002 and other components are formed into a single integrated circuit, or a single package, such as the Edison™ or Galileo™ SoC boards from Intel® Corporation.

Additionally or alternatively, application circuitry 1002 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like: ASICs such as structured ASICs and the like; programmable SoCs (PSoCs): and the like. In such embodiments, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1004 may be implemented, for example, as a solder-down substrate including one or more integrated circuits, a single packaged integrated circuit soldered to a main circuit board or a multi-chip module containing two or more integrated circuits.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include any number and type of memory devices used to provide for a given amount of system memory. As examples, the memory circuitry 1008 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1008 may be developed in accordance with a Joint Electron Devices Engineering Council (JEDEC) low power double data rate (LPDDR)-based design, such as LPDDR2, LPDDR3, LPDDR4, or the like. Memory circuitry 1008 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1008 maybe on-die memory or registers associated with the application circuitry 1002. To provide for persistent storage of information such as data, applications, operating systems and so forth, memory circuitry 1008 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1000 may incorporate the three-dimensional (3D) cross-point (XPOINT) memories from Intel® and Micron®.

The removable memory 1026 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensors 1022 and electro-mechanical components (shown as EMCs 1024), as well as removable memory devices coupled to removable memory 1026.

The sensors 1022 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors, temperature sensors (e.g., thermistors); pressure sensors; barometric pressure sensors, gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1024 include devices, modules, or subsystems whose purpose is to enable platform 1000 to change its state, position, and/or orientation, or move or control a mechanism or (sub)system. Additionally, EMCs 1024 may be configured to generate and send messages/signaling to other components of the platform 1000 to indicate a current state of the EMCs 1024. Examples of the EMCs 1024 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1024 based on one or more captured events and/or instructions or control signals received from a service provider and/or various clients. In some implementations, the interface circuitry may connect the platform 1000 with positioning circuitry 1016. The positioning circuitry 1016 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-PNT IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure (e.g., radio base stations), for turn-by-turn navigation applications, or the like.

In some implementations, the interface circuitry may connect the platform 1000 with Near-Field Communication circuitry (shown as NFC circuitry 1012). The NFC circuitry 1012 is configured to provide contactless, short-range communications based on radio frequency identification (RFID) standards, wherein magnetic field induction is used to enable communication between NFC circuitry 1012 and NFC-enabled devices external to the platform 1000 (e.g., an "NFC touchpoint"). NFC circuitry 1012 comprises an NFC controller coupled with an antenna element and a processor coupled with the NFC controller. The NFC controller may be a chip/IC providing NFC functionalities to the NFC circuitry 1012 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1012, or initiate data transfer between the NFC circuitry 1012 and another active NFC device (e.g., a smartphone or an NFC-enabled POS terminal) that is proximate to the platform 1000.

The driver circuitry 1018 may include software and hardware elements that operate to control particular devices that are embedded in the platform 1000, attached to the platform 1000, or otherwise communicatively coupled with the platform 1000. The driver circuitry 1018 may include individual drivers allowing other components of the platform 1000 to interact with or control various input/output (I/O) devices that may be present within, or connected to, the platform 1000. For example, driver circuitry 1018 may include a display driver to control and allow access to a display device, a touchscreen driver to control and allow access to a touchscreen interface of the platform 1000, sensor drivers to obtain sensor readings of sensors 1022 and control and allow access to sensors 1022, EMC drivers to obtain actuator positions of the EMCs 1024 and/or control and allow access to the EMCs 1024, a camera driver to control and allow access to an embedded image capture device, audio drivers to control and allow access to one or more audio devices.

The power management integrated circuitry (shown as PMIC 1010) (also referred to as "power management circuitry") may manage power provided to various components of the platform 1000. In particular, with respect to the baseband circuitry 1004, the PMIC 1010 may control power-source selection, voltage scaling, battery charging, or DC-to-DC conversion. The PMIC 1010 may often be included when the platform 1000 is capable of being powered by a battery 1014, for example, when the device is included in a UE.

In some embodiments, the PMIC 1010 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1014 may power the platform 1000, although in some examples the platform 1000 may be mounted deployed in a fixed location, and may have a power supply coupled to an electrical grid. The battery 1014 may be a lithium ion battery, a metal-air battery, such as a zinc-air battery, an aluminum-air battery, a lithium-air battery, and the like. In some implementations, such as in V2X applications, the battery 1014 may be a typical lead-acid automotive battery.

In some implementations, the battery 1014 may be a "smart battery," which includes or is coupled with a Battery Management System (BMS) or battery monitoring integrated circuitry. The BMS may be included in the platform 1000 to track the state of charge (SoCh) of the battery 1014. The BMS may be used to monitor other parameters of the battery 1014 to provide failure predictions, such as the state of health (SoH) and the state of function (SoF) of the battery 1014. The BMS may communicate the information of the battery 1014 to the application circuitry 1002 or other components of the platform 1000. The BMS may also include an analog-to-digital (ADC) convertor that allows the application circuitry 1002 to directly monitor the voltage of the battery 1014 or the current flow from the battery 1014. The battery parameters may be used to determine actions that the platform 1000 may perform, such as transmission frequency, network operation, sensing frequency, and the like.

A power block, or other power supply coupled to an electrical grid may be coupled with the BMS to charge the battery 1014. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1014, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1020 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1020 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensors 1022 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 11:
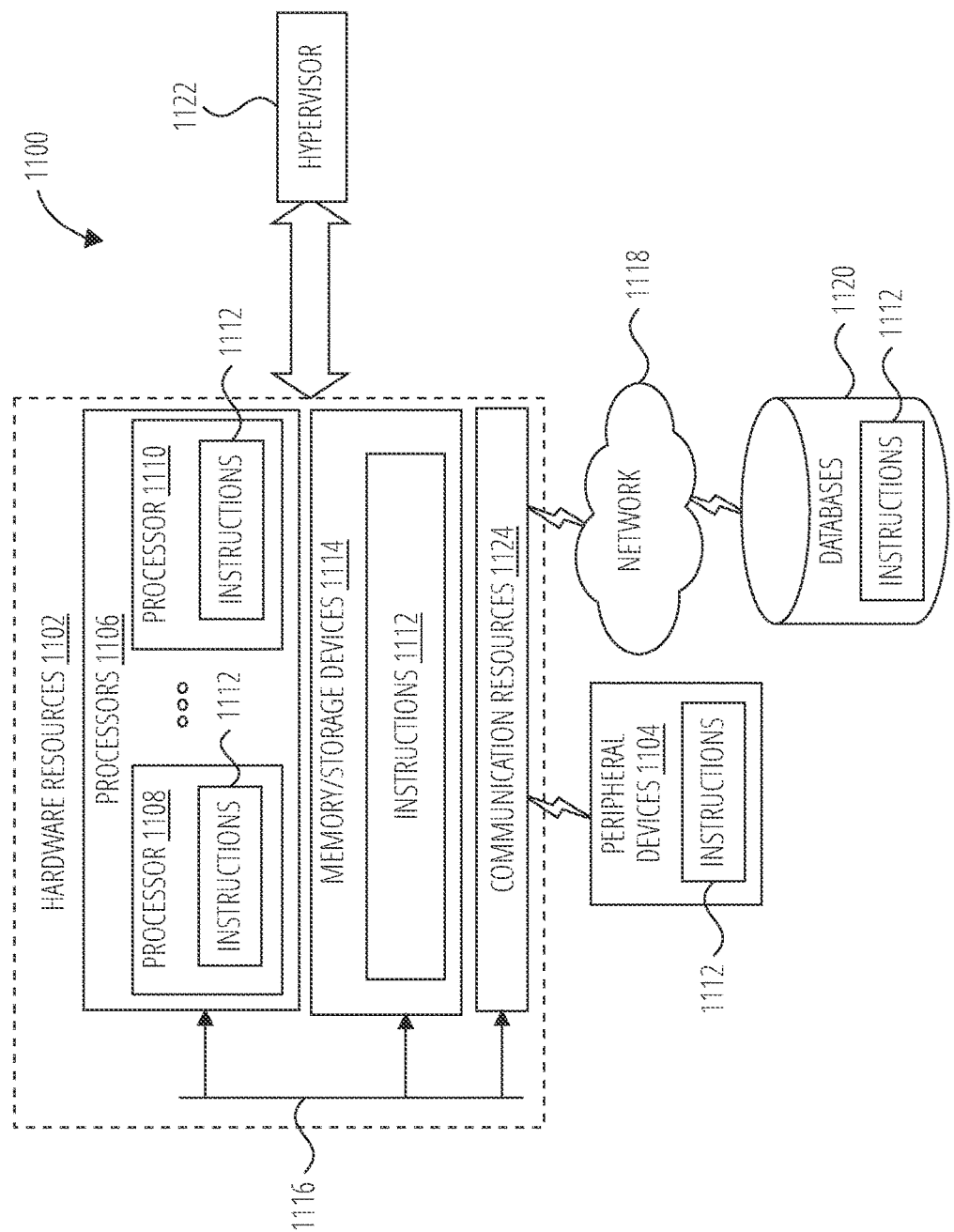
FIG. 11 illustrates system components in accordance with some embodiments.

FIG. 11 is a block diagram illustrating components 1100, according to some embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices/sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory/storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1112 may comprise software, a program, an application, an applet, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include a method for determining physical uplink control channel (PUCCH) transmission repetition. The method may comprise determining that an original PUCCH transmission overlaps a slot boundary, the slot boundary being a boundary between a first slot for PUCCH transmission and a second slot for PUCCH transmission, and configuring a PUCCH repetition of the original PUCCH transmission, wherein the PUCCH repetition includes one or more symbols of the original PUCCH transmission and is located in one or more slots other than the first slot and the second slot, and wherein the PUCCH repetition is configured by a downlink control information (DCI) configuration that includes a physical downlink shared channel to hybrid automatic repeat request acknowledgement feedback (PDSCH-to-HARQ_feedback) timing indicator, a PUCCH repetition number field that configures a number of transmissions of the PUCCH repetition, or a PUCCH resource indicator field that configures a number of transmissions of the PUCCH repetition. The method may further include transmitting the PUCCH repetition.

Example 2 may include the method of Example 1, wherein the DCI configuration includes the PDSCH-to-HARQ_feedback timing indicator, and wherein the PDSCH-to-HARQ_feedback timing indicator is configured by radio resource control (RRC) to configure a number of transmissions of the PUCCH repetition, where the number of transmissions of the PUCCH repetition is a value of a range from 1 to N, where N is greater than 8.

Example 3 may include the method of Example 1, wherein the DCI configuration includes the PUCCH repetition number field, and wherein a value of the PUCCH repetition number field is the number of transmissions of the PUCCH repetition and is of a range from 1 to N, where N is greater than 8.

Example 4 may include the method of Example 1, wherein the DCI configuration includes the PUCCH resource indicator field, and wherein a value of the PUCCH resource indicator field is the number of transmissions of the PUCCH repetition and is of a range from 1 to N, where N is greater than 8.

Example 5 may include the method of Example 1, wherein the PUCCH repetition is restricted to a PUCCH Format 1, a PUCCH Format 3, or a PUCCH Format 4.

Example 6 may include the method of Example 1, wherein the PUCCH repetition includes all symbols of the original PUCCH transmission.

Example 7 may include the method of Example 1, wherein the PUCCH repetition is a truncated version of the original PUCCH transmission that does not include any symbols of the original PUCCH transmission that overlap the slot boundary.

Example 8 may include the method of Example 1, wherein the PUCCH repetition is a segmented version of the original PUCCH transmission formed by a first repetition PUCCH segment that includes all symbols of the original PUCCH transmission located in the first slot and a second repetition PUCCH segment that includes all symbols of the original PUCCH transmission located in the second slot.

Example 9 may include the method of Example 1, wherein the PUCCH repetition is a first PUCCH repetition that satisfies a minimum HARQ-ACK processing time associated with a PDSCH.

Example 10 may include the method of Example 1, wherein the PUCCH repetition satisfies a minimum HARQ-ACK processing time associated with a PDSCH, and wherein a user equipment (UE) is configured to transmit the PUCCH repetition and not transmit one or more other PUCCH repetitions that do not satisfy the minimum HARQ-ACK processing time associated with the PDSCH.

Example 11 may include the method of Example 1, wherein the PUCCH repetition is one of a plurality of PUCCH repetitions that are scheduled back to back and overlap one or more slot boundaries.

Example 12 may include the method of Example 1, wherein the PUCCH repetition is one of a plurality of PUCCH repetitions that are scheduled in consecutive slots and do not overlap any slot boundaries.

Example 13 may include the method of Example 12, wherein the plurality of PUCCH repetitions use a same time domain allocation within each of the consecutive slots.

Example 14 may include the method of Example 1, wherein the original PUCCH transmission includes a downlink (DL) symbol.

Example 15 may include the method of Example 14, wherein the PUCCH repetition is a truncated version of the original PUCCH transmission that does not include any symbols of the original PUCCH transmission located after the DL symbol.

Example 16 may include the method of Example 14, wherein the PUCCH repetition is a segmented version of the original PUCCH formed by a first repetition PUCCH segment that includes all symbols of the original PUCCH transmission located before the DL symbol and a second repetition PUCCH segment that includes all symbols of the original PUCCH transmission located after the DL symbol.

Example 17 may include the method of Example 1, further comprising: reporting a maximum number of PUCCH repetitions a user equipment is configured to transmit within a slot.

Example 18 may include a non-transitory computer-readable storage medium, the computer-readable storage medium including instructions that when executed by a processor, cause the processor to determine that an original physical uplink control channel (PUCCH) transmission overlaps a slot boundary, the slot boundary being a boundary between a first slot for PUCCH transmission and a second slot for PUCCH transmission, and configure a PUCCH repetition of the original PUCCH transmission, wherein the PUCCH repetition includes one or more symbols of the original PUCCH transmission and is located in one or more slots other than the first slot and the second slot, and wherein the PUCCH repetition is configured by a downlink control information (DCI) configuration that includes a physical downlink shared channel to hybrid automatic repeat request acknowledgement feedback (PDSCH-to-HARQ_feedback) timing indicator, a PUCCH repetition number field that configures a number of transmissions of the PUCCH repetition, or a PUCCH resource indicator field that configures a number of transmissions of the PUCCH repetition. The instructions, when executed by the processor, may cause the processor to transmit the PUCCH repetition.

Example 19 may include the non-transitory computer-readable storage medium of Example 18, wherein the PUCCH repetition is a truncated version of the original PUCCH transmission that does not include any symbols of the original PUCCH transmission that overlap the slot boundary.

Example 20 may include a computing apparatus for determining physical uplink control channel (PUCCH) transmission repetition. The computing apparatus may comprise a processor and a memory storing instructions that, when executed by the processor, configure the apparatus to determine that an original PUCCH transmission overlaps a slot boundary, the slot boundary being a boundary between a first slot for PUCCH transmission and a second slot for PUCCH transmission, and configure a PUCCH repetition of the original PUCCH transmission, wherein the PUCCH repetition includes one or more symbols of the original PUCCH transmission and is located in one or more slots other than the first slot and the second slot, and wherein the PUCCH repetition is configured by a downlink control information (DCI) configuration that includes a physical downlink shared channel to hybrid automatic repeat request acknowledgement feedback (PDSCH-to-HARQ_feedback) timing indicator, a PUCCH repetition number field that configures a number of transmissions of the PUCCH repetition, or a PUCCH resource indicator field that configures a number of transmissions of the PUCCH repetition. The instructions, when executed by the processor, may further configure the apparatus to transmit the PUCCH repetition.

Example 21 may include the computing apparatus of Example 20, wherein the PUCCH repetition is a truncated version of the original PUCCH transmission that does not include any symbols of the original PUCCH transmission that overlap the slot boundary.

Example 22 may include an apparatus comprising means to perform one or more elements of a method described in or related to any of the above Examples, or any other method or process described herein.

Example 23 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 24 may include an apparatus comprising logic, modules, or circuitry to perform one or more elements of a method described in or related to any of the above Examples, or any other method or process described herein.

Example 25 may include a method, technique, or process as described in or related to any of the above Examples, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 27 may include a signal as described in or related to any of the above Examples, or portions or parts thereof.

Example 28 may include a datagram, packet, frame, segment, protocol data unit (PDU), or message as described in or related to any of the above Examples, or portions or parts thereof, or otherwise described in the present disclosure.

Example 29 may include a signal encoded with data as described in or related to any of the above Examples, or portions or parts thereof, or otherwise described in the present disclosure.

Example 30 may include a signal encoded with a datagram, packet, frame, segment, PDU, or message as described in or related to any of the above Examples, or portions or parts thereof, or otherwise described in the present disclosure.

Example 31 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 32 may include a computer program comprising instructions, wherein execution of the program by a processing element is to cause the processing element to carry out the method, techniques, or process as described in or related to any of the above Examples, or portions thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for determining physical uplink control channel (PUCCH) transmission repetition, comprising:

determining that an original PUCCH transmission overlaps a slot boundary, the slot boundary being a boundary between a first slot for PUCCH transmission and a second slot for PUCCH transmission;

configuring a PUCCH repetition of the original PUCCH transmission, wherein the PUCCH repetition includes. one or more symbols of the original PUCCH transmission and is located in one or more slots other than the first slot and the second slot, and wherein the PUCCH repetition is configured by a downlink control information (DCI) configuration that includes a physical downlink shared channel to hybrid automatic repeat request acknowledgement feedback (PDSCH-to-HARQ_feedback) timing indicator, and a PUCCH repetition number field that configures a number of transmissions of the PUCCH repetition or a PUCCH resource indicator field that configures a number of transmissions of the PUCCH repetition; and transmitting the PUCCH repetition, wherein the PUCCH repetition is one of a plurality of PUCCH repetitions that are scheduled back to back and wherein the PUCCH repetition overlaps a slot boundary.

2. The method of claim 1, wherein the DCI configuration includes the PDSCH-to-HARQ_feedback timing indicator, and wherein the PDSCH-to-HARQ feedback timing indicator is configured by radio resource control (RRC) to configure a number of transmissions of the PUCCH repetition, where the number of transmissions is a value of a range from 1 to N, where N is greater than 8.

3. The method of claim 1, wherein the DCI configuration includes the PUCCH repetition number field, and wherein a value of the PUCCH repetition number field is the number of transmissions of the PUCCH repetition and is of a range from 1 to N, where N is greater than 8.

4. The method of claim 1, wherein the DCI configuration includes the PUCCH resource indicator field, and wherein a value of the PUCCH resource indicator field is the number of transmissions of the PUCCH repetition and is of a range from 1 to N, where N is greater than 8.

5. The method of claim 1, wherein the PUCCH repetition is restricted to a PUCCH Format 1, a PUCCH Format 3, or a PUCCH Format 4.

6. The method of claim 1, wherein the PUCCH repetition includes all symbols of the original PUCCH transmission.

7. The method of claim 1, wherein the PUCCH repetition is a segmented version of the original PUCCH transmission formed by a first repetition PUCCH segment that includes all symbols of the original PUCCH transmission located in the first slot and a second repetition PUCCH segment that includes all symbols of the original PUCCH transmission located in the second slot.

8. The method of claim 1, wherein the PUCCH repetition is a first PUCCH repetition that satisfies a minimum HARQ-ACK processing time associated with a PDSCH.

9. The method of claim 1, wherein the PUCCH repetition satisfies a minimum HARQ-ACK processing time associated with a PDSCH, and wherein a user equipment (UE) is configured to transmit the PUCCH repetition and not transmit one or more other PUCCH repetitions that do not satisfy the minimum HARQ-ACK processing time associated with the PDSCH.

10. The method of claim 1, wherein the original PUCCH transmission includes a downlink (DL) symbol.

11. The method of claim 10, wherein the PUCCH repetition is a truncated version of the original PUCCH transmission that does not include any symbols of the original PUCCH transmission located after the DL symbol.

12. The method of claim 10, wherein the PUCCH repetition is a segmented version of the original PUCCH formed by a first repetition PUCCH segment that includes all symbols of the original PUCCH transmission located before the DL symbol and a second repetition PUCCH segment that includes all symbols of the original PUCCH transmission located after the DL symbol.

13. The method of claim 1, further comprising:

reporting a maximum number of PUCCH repetitions a user equipment is configured to transmit within a slot.

14. A non-transitory computer-readable storage medium, the computer-readable storage medium including instructions that when executed by a processor, cause the processor to:
- determine that an original physical uplink control channel (PUCCH) transmission overlaps a slot boundary, the slot boundary being a boundary between a first slot for PUCCH transmission and a second slot for PUCCH transmission;
- configure a PUCCH repetition of the original PUCCH transmission, wherein the PUCCH repetition includes one or more symbols of the original PUCCH transmission and is located in one or more slots other than the first slot and the second slot, and wherein the PUCCH repetition is configured by a downlink control information (DCI) configuration that includes a physical downlink shared channel to hybrid automatic repeat request acknowledgement feedback (PDSCH-to-HARQ_feedback) timing indicator, and a PUCCH repetition number field that configures a number of transmissions of the PUCCH repetition or a PUCCH resource indicator field that configures a number of transmissions of the PUCCH repetition; and
- transmit the PUCCH repetition, wherein the PUCCH repetition is one of a plurality of PUCCH repetitions that are scheduled back to back and wherein the PUCCH repetition overlaps a slot boundary.

15. A computing apparatus for determining physical uplink control channel (PUCCH) transmission repetition, the computing apparatus comprising:
- a processor; and
- a memory storing instructions that, when executed by the processor, configure the apparatus to:
  - determine that an original PUCCH transmission overlaps a slot boundary, the slot boundary being a boundary between a first slot for PUCCH transmission and a second slot for PUCCH transmission;
  - configure a PUCCH repetition of the original PUCCH transmission, wherein the PUCCH repetition includes one or more symbols of the original PUCCH transmission and is located in one or more slots other than the first slot and the second slot, and wherein the PUCCH repetition is configured by a downlink control information (DCI) configuration that includes a physical downlink shared channel to hybrid automatic repeat request acknowledgement feedback (PDSCH-to-HARQ_feedback) timing indicator, and a PUCCH repetition number field that configures a number of transmissions of the PUCCH repetition or a PUCCH resource indicator field that configures a number of transmissions of the PUCCH repetition; and
  - transmit the PUCCH repetition, wherein the PUCCH repetition is one of a plurality of PUCCH repetitions that are scheduled back to back and wherein the PUCCH repetition overlaps a slot boundary.

* * * * *